United States Patent
Marti Gastaldo et al.

(10) Patent No.: US 11,787,824 B2
(45) Date of Patent: Oct. 17, 2023

(54) TITANIUM HETEROMETALLIC METAL-ORGANIC SOLIDS, METHOD FOR OBTAINING THEM AND THEIR USES

(71) Applicants: UNIVERSITÄT DE VALÈNCIA, Valencia (ES); UNIVERSIDAD DE GRANADA, Granada (ES)

(72) Inventors: Carlos Marti Gastaldo, Valencia (ES); Javier Castells Gil, Valencia (ES); Natalia Muñoz Padial, Granada (ES)

(73) Assignees: Universitat de València, València (ES); Universidad de Granada, Granada (ES)

( * ) Notice: Subject to any disclaimer, the term of this patent is extended or adjusted under 35 U.S.C. 154(b) by 115 days.

(21) Appl. No.: 17/057,808

(22) PCT Filed: May 23, 2019

(86) PCT No.: PCT/ES2019/070341
§ 371 (c)(1),
(2) Date: Nov. 23, 2020

(87) PCT Pub. No.: WO2019/224413
PCT Pub. Date: Nov. 28, 2019

(65) Prior Publication Data
US 2021/0261577 A1   Aug. 26, 2021

(30) Foreign Application Priority Data
May 23, 2018   (ES) .................. ES201830496

(51) Int. Cl.
*C07F 7/28*    (2006.01)
*C07F 1/08*    (2006.01)
(52) U.S. Cl.
CPC ............... *C07F 7/28* (2013.01); *C07F 1/08* (2013.01); *C07B 2200/13* (2013.01)
(58) Field of Classification Search
None
See application file for complete search history.

(56) References Cited

FOREIGN PATENT DOCUMENTS

EP   3254755 A1   12/2017

OTHER PUBLICATIONS

PCT International Search Report and Written Opinion completed by the ISA/ES dated Aug. 28, 2019 and issued in connection with PCT/ES2019/070341.
Yuanfu Deng et al, "Heterobimetallic peroxo-titanium(iv) nitrilotriacetate complexes as single source precursors or preparation of MTiO3 (M=Co, Ni and Zn)", Dalton Transaction, vol. 39, No. 10, Jan. 1, 2010 (Jan. 1, 2010), p. 2497.
Liqing Ma et al, "A series of isoreticular chiral metal-organic frameworks as a tunable platform for asymmetric catalysis", Nature Chemistry, vol. 2, No. 10, Jul. 25, 2010 (Jul. 25, 2010), p. 838-846.
Deng Y et al, "Synthesis of calcium titanate from [Ca(H"2O)"3]"2[Ti"2(O"2)"2O(NC"6H"6O"6)"2].2H"2O as a cheap single-source precursor", Mar. 1, 2010 (Mar. 1, 2010), vol. 12, No. 3, p. 339-344.
Hong, K.Chun, H., "Unprecedented and highly symmetric (6,8)-connected topology in a porous metal-organic framework through a Zn—Ti heterometallic approach", Chem. Commun., vol. 49, 2013, p. 10953-10955.
Keunil Hong et al, "Unique Coordination-Based Heterometallic Approach for the Stoichiometric Inclusion of High-Valent Metal Ions in a Porous Metal-Organic Framework", Inorganic Chemistry, vol. 52, No. 10, May 20, 2013 (May 20, 2013), p. 5645-5647.

*Primary Examiner* — Joseph R Kosack
(74) *Attorney, Agent, or Firm* — Barnes & Thornburg LLP

(57) ABSTRACT

The present invention relates to a new family of titanium heterometallic structured metal-organic materials (MOFs) having, among other characteristics, high porosity, stability in an aqueous medium and photocatalytic activity under visible light and UV radiation. The new family of materials has a structural unit that combines tetravalent titanium with multiple combinations of divalent metals with a homogeneous distribution at atomic level in the MOF structure.
The invention also relates to methods for obtaining them with high yields, in addition to their uses in the generation of solar fuels, photoactivated degradation, photoreduction of $CO_2$, heterogeneous catalysis, as a component or part of an electronic component and/or as a porous or photoactive coating for controlling pollutants, inter alia.

20 Claims, 8 Drawing Sheets

(a)

(b)

TITANIUM HETEROMETALLIC METAL-ORGANIC SOLIDS, METHOD FOR OBTAINING THEM AND THEIR USES

CROSS-REFERENCE TO RELATED APPLICATIONS

This application is a U.S. national counterpart application of international application serial No. PCT/ES2019/070341 filed May 23, 2019, which claims priority to Spanish Application No. P201830496 filed May 23, 2018.

The present invention relates to a new family of structured titanium heterometallic metal-organic materials (MOFs) having, inter alia, high porosity, stability in an aqueous medium and photocatalytic activity under visible light and UV radiation.

The invention also relates to methods for obtaining them and their uses in catalysis, adsorption, separation, storage of gases and photocatalysis, among others.

BACKGROUND OF THE INVENTION

Metal-organic networks or Metal-Organic Frameworks (MOF) constitute a type of porous solids consisting of metal atoms or clusters of metal atoms as active centres coordinated with organic ligands to create open crystalline structures with permanent porosity. Given the wide variety of both metal atoms and organic ligands, there is a constant interest in finding new metal-organic structures having different properties.

The most important aspects of MOFs include, namely, high adsorption capacity, the ability to generate active centres with different chemical stability in their structure, the uniform size of their channels and cavities which are in the same order of magnitude as many molecules of industrial interest, excellent ion exchange capacity, photoactivity and interesting electronic properties that vary from insulators to conductors and semi-conductors.

Within the context of catalysis, the metal ions present in the MOF structure can act as active centres when they have vacant coordination positions, or the organic ligands can be the active centres where the desired reaction takes place, i.e. both organic ligands and metal ions can act as active centres. The active centre can be introduced in the MOFs both during synthesis thereof and in a post-synthesis treatment process, which generally implies a metal exchange method using a preformed MOF to obtain the same material with a random distribution of different metal ions or organic ligands in their structure. Additionally, both the organic part and the inorganic part of the MOFs can be functionalised to introduce other catalytic centres in the interior of the material pores (metal nanoparticles, oxides or metal complexes, etc.).

The main problem of many MOFs known to date is their low stability in an aqueous medium, which limits their use in many applications of industrial relevance. This limitation is established by the low stability of the metal-ligand coordination bonds that define their connectivity, structure and porosity intrinsic to most of the metals used (mainly first transition series metals and lanthanides). These coordination bonds are not usually robust enough from a thermodynamic viewpoint to prevent hydrolysis processes (bond breakage in an aqueous medium) or in the presence of acids or bases. In order to solve said problem, high-oxidation state metals have been used such as Ti(IV), which entails M-O bond energies of up to 750 kJ·mol$^{-1}$, endowing the resulting MOFs with much higher chemical stability. However, to date a very low number of titanium MOFs have been disclosed, and in all cases are based on processes limited to specific combinations of relatively expensive synthetic organic ligands and Ti(IV) metal precursors. The MOFs disclosed can only be prepared from certain combinations of these two components and cannot be obtained as crystals in scalable form or adapted to different synthesis processes. This difficulty lies in the high reactivity of Ti(IV) in solution, which tends to form amorphous titanium oxide solids, thereby complicating the synthesis of porous and crystalline materials.

Much effort has been dedicated to increase the chemical stability of MOFs, whether through the post-synthetic modification of preformed materials or by creating new structures using high-oxidation state metals capable of forming more robust bonds with the organic ligand such as Ti, Zr or Hf(IV).

Ti(IV) is known to have advantages over Zr or Hf(IV) due to its low cost, low toxicity and photoactive properties. However, the high reactivity of Ti(IV) makes it very difficult to obtain crystalline systems. Ti(IV) metal-organic systems, such as MIL-125, PCN-22, NTU-9, Ti-CAT-5, MIL-91, MOF-901 and COK-69, are known. However, these systems exclusively include titanium as the only metal forming part of the structural unit of the MOF.

Thus, international patent application WO2010/094889 discloses a method for preparing the material MIL-125. However, the inorganic part of the material is always based solely on titanium homometallic clusters that impede the synthesis of crystalline and porous materials based on combinations of titanium with other metals. The methodology used requires multiple chemical reactions to prepare the ligands of interest, which results in a significant increase in production costs.

International patent application WO2017211923A1 and American patent U.S. Pat. No. 8,940,392B2 disclose the preparation of Ti(IV) MOF materials using tetradentate ligands having a large number of Ti atoms forming the metallic cluster or inorganic part of the MOF. American patent U.S. Pat. No. 8,940,392B2 discloses a method for doping the MOF system with +3 oxidation state metals, which reaches doping percentages of up to 20%. However, none of these methods disclose a synthesis method applicable to the large-scale production of these materials.

In the heterometallic MOFs disclosed in literature, the inclusion of a second metal takes place by post-synthetic modification of a preformed material. This significantly conditions the homogeneity of the resulting MOF, which usually has variable distributions of both metals in its structure, with the second metal included concentrated mainly on the superficial part of the crystal as a result of the kinetic problems associated with the chemical balance that controls metal replacement.

Hong, K. & Chun, H. in "*Unprecedented and highly symmetric (6,8)—connected topology in a porous metal-organic framework through a Zn—Ti heterometallic approach*", Chem. Commun. 2013, 49, 10953 discloses a MOF system that uses nitrogenated DABCO-type ligands (1,4-diazabicyclo[2.2.2]octane) and Zn as an active centre. However, the system is easily decomposed in an aqueous medium, due to which it is not suitable for photocatalysis nor it is active under visible light. The low stability of this system is due to the fact that coordination bonds based on nitrogenated monodentate ligands are not usually robust enough from the thermodynamic viewpoint to prevent hydrolysis processes (bond breakage in an aqueous medium) or in the presence of acids or bases.

Patent CN106299344 discloses a negative nickel titanate electrode used as a sodium battery with a disc-shaped porous structure. The structure or chemical composition of the MOF, which is used as a sacrificial compound to produce nickel titanate, is not disclosed. It does not mention the existence of an organic part in the MOF nor the atomic distribution of the MOF. In the examples, the ligand is slowly added under stirring, which implies certain system kinetics and, consequently, a certain chemical balance during the reaction.

Furthermore, document US2010/0226991 discloses any crystalline, porous and isoreticular MOF solid of formula $M_mO_kX_lL_p$, wherein m, k, l and p are greater than or equal to 0, whose surface is modified to contain an agent with an organic surface, for use as a contrast agent, drug delivery, cosmetic applications or vectorisation and/o monitoring drugs in a body. The material is heterogeneous and the examples make reference to homometallic MOFs, exclusively incorporating Fe(III) to its structure.

EP3001495 specifically discloses MIL-125 (Ti), which exclusively contains Ti. It does not disclose a MOF containing Ti and another divalent metal.

Therefore, the methods disclosed to date are based on the extrinsic doping of the titanium MOF, carrying out the synthesis of the MOF and subsequently incorporating the metals in a second stage, which does not enable precise control over the distribution of the metals in the MOF and, therefore, it is not possible to obtain a homogeneous distribution of the metals in the MOF. This has a very negative impact on the control of the physico-chemical properties of the final material, relevant to the subsequent application thereof.

Therefore, to date there is no titanium heterometallic MOF solid with homogeneous distribution of the metals in the MOF that also has a high surface area, crystallinity, good stability in an aqueous medium and in extreme acid/base conditions and photocatalytic activity under visible light and UV radiation, which can easily be obtained on an industrial scale using simple, accessible and inexpensive starting materials.

Neither does a titanium heterometallic MOF solid exist in the state of the art whose photoactivity (visible light and UV radiation), electronic (band gap) or stability (in an aqueous medium and in extreme acid/base conditions) characteristics can be precisely controlled and easily and inexpensively pre-designed.

Therefore, there is a need to have a methodology to manufacture a highly efficient, low-cost titanium heterometallic MOF solid on an industrial scale that makes it possible to pre-design the final properties of the titanium MOF solid.

Therefore, the present invention focuses on the structural unity of the MOF solid, a crystalline and porous Ti(IV)-M (II) heterometallic cluster. The adequate selection of the starting materials in an intrinsic doping method makes it possible to obtain, in a single stage, a titanium heterometallic MOF solid with homogeneous distribution of the metals in the structure of the material at atomic level, which has a large surface area, crystallinity, good chemical stability and photocatalytic activity under visible light and UV radiation, whose properties can be pre-designed at will according to the desired applicable final properties of the MOF solid.

DESCRIPTION OF THE INVENTION

The present invention was made taking into account the previously disclosed state of the art and the object of the present invention is, in a first aspect, to provide a crystalline and porous titanium heterometallic MOF solid, with homogeneous distribution at atomic level of the metals in the MOF, whose photoactivity (under visible light and UV radiation), electronic (band gap) and stability (in an aqueous medium and in extreme acid-base conditions) properties, inter alia, can easily and inexpensively be modified in the final MOF according to the desired properties.

To address this problem, the present invention provides, in a first aspect, a crystalline and porous Ti(IV) heterometallic MOF solid, characterised in that it comprises a tricarboxylic ligand L as the organic part of the MOF and $Ti^{IV}$ with at least one $M^{II}_{(1-5)}$ divalent metal in the structural unit and inorganic part of the MOF, wherein the $Ti^{IV}$ and the at least one $M^{II}_{(1-5)}$ divalent metal are homogeneously distributed at atomic level in the MOF structure, and wherein the MOF solid also includes at least one polar solvent S molecule.

Within the context of the present invention, "structural unit" of the MOF is understood to be any metal cluster or organic ligand which, forming part of the MOF structure, can also act as an "active centre(s)" of the MOF.

Within the context of the present invention, "titanium heterometallic MOF solid" is understood to be a structured metal-organic material solid whose inorganic part of the MOF structural unit is formed of titanium and the divalent metal(s).

Within the context of the present invention, "atomic-level homogeneous distribution" is understood to be that the atomic proportion between the different metals integrated in the solid is the same, regardless of the area of the crystalline solid examined.

In a preferable embodiment, the $Ti^{IV}$ and the at least one divalent metal $M^{II}_{(1-5)}$ jointly form a metal cluster that is interconnected with the tricarboxylic ligand L, forming a crystalline and porous three-dimensional structure. In the present invention, an architecture combining high porosity with chemical stability and improved photocatalytic activity compared to that of titanium dioxide is assembled.

That is, the authors of the present invention found that the use of Ti(IV) heterometallic clusters as a MOF structural unit makes it possible to control the reactivity of the titanium in solution and adapt the synthesis of these MOFs to different methods and combinations between the metals, i.e. between the titanium and the divalent metals, providing a homogeneous distribution thereof at atomic level throughout the MOF.

Thus, the scope of the present invention encompasses a system integrated by said Ti(IV) heterometallic MOF solids, whose relationship between the titanium and the divalent metal(s) can be modulated at will to optimise, inter alia, their structure, porosity, chemical stability, electronic structure and photocatalytic activity under visible light, as opposed to the titanium dioxide which is only active under UV radiation.

This modification at atomic level, i.e. the introduction of two or more different metals in the structural unit of the MOF with different proportions among these metals in the structural unit, makes it possible to better control the reactivity of the titanium in solution and adapt its synthesis to different methods using high-performance methodologies such as robotic chemistry. This control is not only limited to binary combinations, but rather the titanium can also be combined with up to 5 different types of divalent metals in the same structural unit and inorganic part of the MOF solid.

In accordance with the first aspect of the invention, the Ti(IV) heterometallic MOF solid may contain Ti(IV) and from one to five divalent metals $M^{II}$, ($M^{II}_{(1-5)}$), and the relationship between Ti(IV) and M(II) is understood here considering that $M(II)=\Sigma M_{(1-5)}$. The $Ti^{IV}:M^{II}_{(1-5)}$ ratio, unless specified otherwise, indicates Ti(IV) moles: moles of divalent metal(s). Within the context of the invention, M(II) has the same meaning as $M^{II}$ and Ti(IV) has the same meaning as $Ti^{IV}$. Within the context of the invention, Ti has the same meaning as Ti(IV) and M has the same meaning as M(II).

The combination of titanium with divalent metals varying their identity and relative proportion in the MOF structure at atomic level makes it possible to obtain a family of titanium heterometallic metal-organic materials with chemical stability, porosity, optical, electronic and catalytic properties within a very wide range of structures and formulations.

The M" divalent metal can be selected from $Mg^{2+}$, $Ca^{2+}$, $Sr^{2+}$, $Ba^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$ or $Cd^{2+}$.

The crystalline and porous Ti(IV) heterometallic MOF solid has photocatalytic activity under visible light and UV radiation.

Advantageously, the variation in the $Ti^{Iv}:M^{II}_{(1-5)}$ ratio in the structural unit of the MOF makes it possible to modulate the photocatalytic activity under visible light and/or under UV radiation of the Ti(IV) heterometallic MOF solid of the invention.

The crystalline and porous Ti(IV) heterometallic MOF solid is stable in an aqueous medium and in extreme acid and basic conditions.

Advantageously, the variation in the $Ti^{Iv}:M^{II}_{(1-5)}$ ratio in the structural unit of the MOF makes it possible to modulate stability in an aqueous medium and in extreme acid/base conditions. In one embodiment, the Ti(IV) heterometallic MOF solid is chemically stable in a pH range comprised between 1-13, 1-10 or 2-12.

In a particular embodiment, the crystalline and porous Ti(IV) heterometallic MOF solid has a (BET) surface area greater than or equal to 1,000 m²/g.

The crystalline and porous Ti(IV) heterometallic MOF solid has modulable electronic properties.

Advantageously, the variation in the $Ti^{Iv}:M^{II}_{(1-5)}$ ratio in the structural unit of the MOF makes it possible to modulate electronic properties such as band gap in the Ti(IV) heterometallic MOF solid of the invention.

Preferably, the tricarboxylic ligand L is selected from a tricarboxylic 06-aryl acid, a tricarboxylic $C_3N_3$-aryl acid or a derivative thereof of the type tricarboxylic $(C'_6$-aryl$)_3$-$C_6$-aryl or $(C'_6$-aryl$)_3$-$C_3N_3$-aryl acid.

A tricarboxylic ligand L having one of the following structures is preferred:

(A) tricarboxylic $C_6$-aryl:

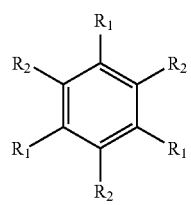

$R_1$=—COOH
$R_2$=—H, —$(CH_2)_{0-5}$—$CH_3$, —$NH_2$, —OH, —$NO_2$, —COOH or halogen (B) tricarboxylic $C_3N_3$-aryl:

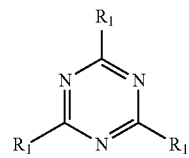

$R_1$=—COOH (C) tricarboxylic $(C'_6$-aryl$)_3$-$C_6$-aryl:

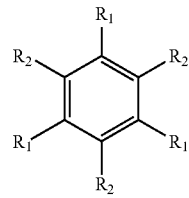

wherein $R_1$ is selected from:

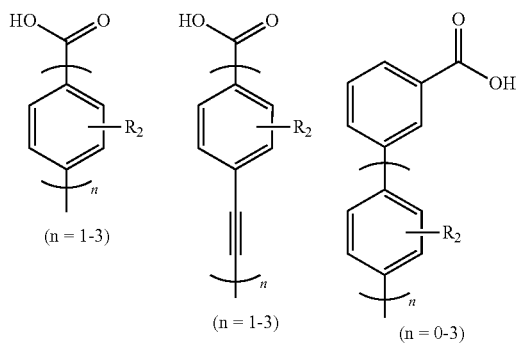

(n = 1-3)  (n = 1-3)  (n = 0-3)

$R_2$=—H, —$(CH_2)_{0-5}$—$CH_3$, —$NH_2$, —OH, —$NO_2$, —COOH or halogen (D) tricarboxylic $(C'_6$-aryl$)_3$-$C_3N_3$-aryl:

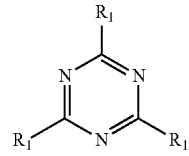

wherein $R_1$ is selected from:

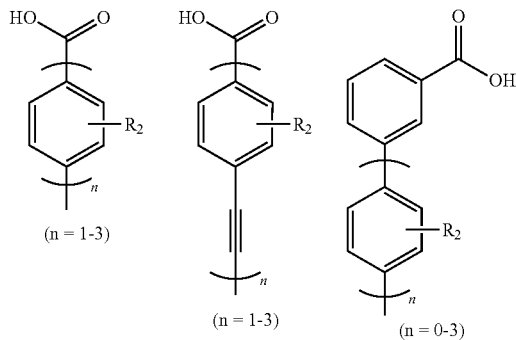

(n = 1-3)  (n = 1-3)  (n = 0-3)

$R_2$=—H, —$(CH_2)_{0-5}$—$CH_3$, —$NH_2$, —OH, —$NO_2$, —COOH or halogen

Even more preferably, 1,3,5-benzenetricarboxylic acid ligand, also called trimesic acid or trimesate ligand.

The molecular structure of the Ti(IV) heterometallic MOF solid, according to the first aspect of the invention, includes polar solvent molecules, which can be water molecules due to the ambient humidity or resulting from the method of obtainment.

The polar solvent S can be selected from N,N-dimethylformamide, N,N-diethylformamide, N,N-dimethylacetamide, N-methyl-2-pyrrolidone, methanol, ethanol, isopropanol, n-propanol, water and mixtures thereof.

In one embodiment, the MOF solid comprises a proportion of titanium in the inorganic part less than or equal to 50%, being the remaining part up to 100% of divalent metal(s). In another embodiment, the MOF solid comprises a proportion of titanium in the inorganic part comprised between 50% and 15%, being the remaining part up to 100% of divalent metal(s).

In one embodiment, the crystalline and porous Ti(IV) heterometallic MOF solid has a molecular structure represented by the general formula (MUV-10):

$[Ti^{IV}_3 M^{II}_3 (O)_3 L_4]S$ wherein:

$M^{II}_{(1-5)}$, each independently, is a $Mg^{2+}$, $Ca^{2+}$, $Sr^{2+}$, $Ba^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$ or $Cd^{2+}$ cation; L is a tricarboxylic ligand; and S is at least one molecule of N,N-dimethylformamide, N,N-diethylformamide, N,N'-dimethylacetamide, N-methyl-2-pyrrolidone, methanol, ethanol, isopropanol, n-propanol, water or mixtures thereof.

In one embodiment of the molecular structure of the general formula (MUV-10), the ratio $Ti^{IV}:M^{II}_{(1-5)}$ can be comprised between 50:50 and 99:1.

In a different embodiment, the crystalline and porous Ti(IV) heterometallic MOF solid has a molecular structure represented by the general formula (MUV-101):

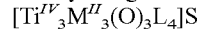

wherein:

z is a rational number comprised between a value greater than 0 and less than 1.5;

L is a tricarboxylic ligand; and

S is at least one molecule of N,N-dimethylformamide, N,N-diethylformamide, N,N'-dimethylacetamide, N-methyl-2-pyrrolidone, methanol, ethanol, isopropanol, n-propanol, water or mixtures thereof.

In one embodiment of the molecular structure of general formula (MUV-101), the ratio $Ti^{IV}:Cu^{II}$ can be comprised between 15:85 and 99:1. In this ratio of $Ti^{IV}:Cu^{II}$, the value of "z" in the general formula (MUV-101) ranges from 0.39 to 1.49.

In another embodiment of the molecular structure of general formula (MUV-101), the ratio $Ti^{IV}:Cu^{II}$ can be comprised between 15:85 and 50:50. In this ratio of $Ti^{IV}:Cu^{II}$, the value of "z" in the general formula (MUV-101) ranges from 0.39 to 1.

In still another different embodiment, the crystalline and porous Ti(IV) heterometallic MOF solid has a molecular structure represented by the general formula (MUV-102):

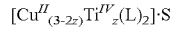

wherein:

w is a rational number comprised between a value greater than 0 and less than 3;

X is, independently, a $F^-$, $Cl^-$ or $OH^-$ anion;

$M^{II}_{(1-5)}$ each independently, is a $Mg^{2+}$, $Ca^{2+}$, $Sr^{2+}$, $Ba^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$ or $Cd^{2+}$ cation;

L is a tricarboxylic ligand; and

S is at least one molecule of N,N'-dimethylformamide, N,N'-diethylformamide, N,N'-dimethylacetamide, N-methyl-2-pyrrolidone, methanol, ethanol, isopropanol, n-propanol, water or mixtures thereof.

In one embodiment of the molecular structure of general formula (MUV-102), the ratio $Ti^{IV}:M^{II}_{(1-5)}$ can be comprised between 99:1 and 33:67. In this ratio of $Ti^{IV}:M^{II}_{(1-5)}$, the value of "w" in the general formula (MUV-102) ranges from 0.03 to 2.01.

In another embodiment of the molecular structure of general formula (MUV-102), the ratio can be comprised between 50:50 and 33:67. In this ratio of $Ti^{IV}:M^{II}_{(1-5)}$, the value of "w" in the general formula (MUV-102) ranges from 1.5 to 2.01.

In still another embodiment of the molecular structure of general formula (MUV-102), the ratio $Ti^{IV}:M^{II}_{(1-5)}$ can be comprised between 50:50 and 15:85. In this ratio of $Ti^{IV}:M^{II}_{(1-5)}$, the value of "w" in the general formula (MUV-102) ranges from 1.5 to 2.55.

Surprisingly, the authors of the present invention found that all the Ti(IV) heterometallic MOF solids according to the first aspect of the present invention have photocatalytic activity under visible light and at least one of the following conditions:

chemical stability in an aqueous medium;

chemical stability in a pH range comprised between 1-13, 1-10 or 2-12;

porosity with a (BET) surface area greater than or equal to 1,000 m²/g;

photocatalytic activity under UV radiation.

In the present invention, the sizes of the micrometric particles that make up the crystalline MOF solids obtained are comprised between 1-500 µm.

Also, the crystalline and porous Ti(IV) heterometallic MOF solids have thermal stability between −50° C. and 500° C. They also exhibit good adsorption properties of gases such as, for example, $N_2$ and $CO_2$.

These and other characteristics intrinsic to the new Ti(IV) heterometallic MOF solids make them especially useful in the generation of solar fuels, photoactivated degradation processes, photoreduction of $CO_2$, heterogeneous catalysis and as porous semi-conductors with variable electronic properties, among other applications.

In a second aspect, the present invention provides a method for obtaining Ti(IV) heterometallic MOF solids based on intrinsic doping in a single synthesis stage and with simple and low-cost precursors, which makes it possible to modify, among other properties, their photocatalytic activity under visible light and UV radiation at will.

Advantageously, the metal precursors used are simple and low-cost compounds, and the method for obtaining the Ti(IV) heterometallic MOF solid is designed to enable their combination in a single phase with high yields, with precise control over the distribution of the metals, i.e. titanium and divalent metal(s), at atomic level in the MOF obtained, and with the desired proportion between the two metals for extreme control over the electronic, catalytic and photoactive properties of the MOF obtained.

Surprisingly, the authors of the invention found how to introduce the metals Ti(IV) and $M^{II}_{(1-5)}$ to form the active centres of the MOF for these to be homogeneously distributed at atomic level throughout the MOF.

Thus, in a second aspect, the invention provides a method for obtaining the Ti(IV) heterometallic MOF solid defined in the first aspect of the invention, whose method is characterised in that an intrinsic doping of Ti(IV) and at least one $M^{II}_{(1-5)}$ divalent metal is carried out in a one-pot synthesis as follows:

(i) mixing:
   a polar solvent, S:
   a Ti(IV) precursor,
   at least one salt of a divalent metal of formula $MX_2$ or MY,
   wherein:
   M is $Mg^{2+}$, $Ca^{2+}$, $Sr^{2+}$, $Ba^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$ or $Cd^{2+}$;
   X is $F^-$, $Cl^-$, $Br^-$, $I^-$, $NO_3^-$, $ClO_4^-$, $BF_4^-$, $SCN^-$, $OH^-$, $CH_3COO^-$ or $C_5H_7O_2^-$,
   Y is $SO_4^{2-}$ or $CO_3^{2-}$,
   a tricarboxylic ligand L,
     wherein the stoichiometric relationship between the at least one divalent metal salt and the ligand is comprised between 1:1 and 1:6, preferably between 1:1.1 and 1:6, more preferably approximately 1:3, such that the ligand is in stoichiometric excess.
   and, optionally, an inorganic acid in a molar relationship comprised between 5 and 500 gram equivalents/mole of salt $MX_2$ or MY; and, next,
(ii) heating the reaction mixture to give the $Ti^{IV}$-$M^{II}_{(1-5)}$ MOF solid, wherein $Ti^{IV}$ and the at least one divalent metal $M^{II}_{(1-5)}$ jointly form an interconnected metal cluster with the tricarboxylic ligand L, wherein $Ti^{IV}$ and the at least one divalent metal $M^{II}_{(1-5)}$ are homogeneously distributed at atomic level in the MOF.

Advantageously, the method disclosed herein enables intrinsic single-phase doping or one-pot synthesis, easily and with direct control over the proportions of Ti(IV) precursor and divalent metal salt(s) in the MOF obtained. In one embodiment, the proportion of titanium in the MOF is smaller than or equal to 50%, with divalent metal(s) making up the remaining part until 100%. In another embodiment, the proportion of titanium in the MOF is comprised between 50% and 15%, with divalent metal(s) making up the remaining part until 100%. Unexpectedly, the combination of Ti(IV) precursors and certain divalent metal salts with the selection of a tricarboxylic ligand enables the formation of a crystalline solid of trigonal prismatic geometry with new intrinsic characteristics in the MOF obtained.

All the methods disclosed herein provide a Ti(IV) heterometallic MOF solid with homogeneous distribution of—Ti(IV) and $M(II)_{(1-5)}$—metals at atomic level throughout the MOF structure.

Advantageously, the methods disclosed herein make it possible to obtain a crystalline and porous Ti(IV) heterometallic MOF solid at gram scale with yields above 80%.

In a preferred embodiment of the method of the invention, intrinsic doping is carried out by "direct reaction".

In a different embodiment of the invention, intrinsic doping is carried out by "post-synthetic transformation". The general post-synthetic methodology for preparing heterometallic MOFs involves metal exchange by chemical treatment of a preformed material in the presence of the metal that must be incorporated to the same structure by metal exchange. Contrarily, in this embodiment, the material called MUV-10 can be used as a starting material to generate new heterometallic MOFs by transformation of this precursor into other MOFs with different structure, porosities and physical properties.

Advantageously, post-synthetic transformation provides, in the same manner as the intrinsic doping by direct reaction, a Ti(IV) heterometallic MOF solid with homogeneous distribution of the metals, titanium and divalent metal(s) at atomic level throughout the MOF structure. This is achieved because the Ti(IV) precursor chosen to be used in the post-synthetic transformation is a Ti(IV) heterometallic MOF solid, as defined in the first aspect of the present invention.

In the context of the invention, the polar solvent S can consist of a single solvent including one or more molecules of that solvent or a mixture of polar solvents. Thus, according to the general formulas of the MOFs, the solvent represented by S includes any proportion with respect to the rest of the elements in the formula.

The polar solvent can be selected from N,N-dimethylformamide (DMF), N,N'-diethylformamide (DEF), N,N-dimethylacetamide, N-methyl-2-pyrrolidone (NMP), methanol, ethanol, isopropanol, n-propanol, water and mixtures thereof.

The preferred polar solvent is N,N-dimethylformamide (DMF) or a mixture of N,N'-dimethylformamide (DMF) and N-methyl-2-pyrrolidone (NMP), preferably in a ratio of 1:1.

In the context of the invention, the inorganic acid can be selected from hydrochloric acid, formic acid, acetic acid, propanoic acid, benzoic acid and derivatives thereof.

The Ti(IV) precursor can be selected from a Ti(IV) organometallic precursor such as a Ti(IV) alkoxide, preferably, Ti(IV) isopropoxide, Ti(IV) methoxide, Ti(IV) ethoxide, Ti(IV) n-propoxide, Ti(IV) n-butoxide, Ti(IV) (triethanolaminato)isopropoxide, Ti(IV) tert-butoxide, Ti(IV) oxyacetylacetonate; the Ti(IV) precursor can also be a titanium compound such as Ti(IV) tetrachloride, bis(cyclopentadienyl)-Ti(IV) dichloride, cyclopentadienyl-Ti(IV) trichloride or Ti(IV) oxosulphate or similar; or a Ti(IV) polynuclear compound stable in air such as a Ti(IV) hexanuclear complex.

In one embodiment, the Ti(IV) precursor is the Ti(IV) heterometallic MOF solid itself according to the first aspect of the invention, preferably the Ti(IV) heterometallic MOF solid of formula MUV-10.

In one embodiment, the tricarboxylic ligand L can be selected from a tricarboxylic $C_6$-aryl acid, a tricarboxylic $C_3N_3$-aryl acid or a derivative thereof of the type tricarboxylic $(C'_6\text{-aryl})_3$-$C_6$-aryl or $(C'_6\text{-aryl})_3$-$C_3N_3$-aryl acid. Preferably, the L tricarboxylic acid is trimesic acid.

In one embodiment of the method of the invention, the Ti(IV) heterometallic MOF solid being prepared has the formula (MUV-10) $[Ti^{IV}_3M^{II}_3(O)_3L_4]S$, and comprises, in a one-pot synthesis and by direct reaction, the following stages:

(i) mixing: the polar solvent, S: the Ti(IV) precursor, at least one salt of a divalent metal of formula $MX_2$ or MY, the tricarboxylic ligand L and inorganic acid defined above,
and, next,
(ii) heating the reaction mixture at a temperature of more than 80° C. for a period greater than or equal to 24 hours, and then cooling to give the MOF solid of formula (MUV-10).

In one embodiment, $Ti^{Iv}$ and the at least one divalent metal $M^{II}_{(1-5)}$ are in a $Ti^{Iv}$:$M^{II}_{(1-5)}$ ratio comprised between 50:50 and 99:1.

In another different embodiment of the method of the invention, the MOF solid being prepared has the formula (MUV-101) $[Cu^{II}_{(3-2z)}Ti^{IV}_z(L)_2]S$ and comprises, in a one-pot synthesis and by direct reaction, the following stages:

(i) mixing: the polar solvent, S: the Ti(IV) precursor, at least one salt of a divalent metal of formula $CuX_2$ or CuY, and the tricarboxylic ligand L defined above, and, next, (ii) heating the reaction mixture at a temperature of more than 100° C. for a period greater than or equal to 24 hours, and then cooling to give the MOF solid of formula (MUV-101).

In one embodiment, $Ti^{IV}$ and $Cu^{II}$ are in a $Ti^{IV}:Cu^{II}$ ratio comprised between 15:85 and 99:1. In another embodiment, $Ti^{IV}$ and $Cu^{II}$ are in a $Ti^{IV}:Cu^{II}$ ratio comprised between 15:85 and 50:50.

In another different embodiment of the method of the invention, the MOF solid being prepared has the formula (MUV-102) $[Ti^{IV}_{(3-w)}M^{II}_{w}O(L)_2X_{(3-w)}]S$ and comprises, in a one-pot synthesis and by direct reaction, the following stages:

(i) mixing in the polar solvent, S: the Ti(IV) precursor, at least one salt of a divalent metal of formula $MX_2$ or MY, the tricarboxylic acid L and the inorganic acid defined above, and, next, (ii) heating the reaction mixture at a temperature of more than 80° C. for a period greater than or equal to 48 hours, and then cooling to give the MOF solid of formula (MUV-102).

In one embodiment, $Ti^{IV}$ and the at least one divalent metal $M^{II}_{(1-5)}$ are in a $Ti^{IV}:M^{II}_{(1-5)}$ ratio comprised between 99:1 and 33:67. In another embodiment, Ti and the at least one divalent metal $M^{II}_{(1-5)}$ are in a $Ti^{IV}:M^{II}_{(1-5)}$ ratio comprised between 50:50 and 33:67. In still another embodiment, $Ti^{IV}$ and the at least one divalent metal $M^{II}_{(1-5)}$ are in a $Ti^{IV}:M^{II}_{(1-5)}$ ratio comprised between 50:50 and 15:85.

Preferably, the methods disclosed above for obtaining a MOF solid by means of one-pot synthesis and by direct reaction use temperatures of less than 150° C., more preferably lower than 140° C., and still more preferably lower than 130° C.

In another different embodiment of the method of the invention, the MOF solid being prepared has the formula (MUV-101) $[Cu^{II}_{(3-2z)}Ti^{IV}_{z}(L)_2]S$ and comprises, in a one-pot synthesis and by post-synthetic transformation, the following stages:

(i) mixing in the polar solvent, S: the Ti(IV) precursor, at least one salt of a divalent metal of formula $CuX_2$ or CuY, and the tricarboxylic ligand L, wherein the Ti(IV) precursor is the Ti(IV) heterometallic MOF solid as defined in the first aspect of the invention, preferably the Ti(IV) heterometallic MOF solid of formula MUV-10, and, next, (ii) heating the reaction mixture at a temperature of less than 100° C. and then cooling to give the MOF solid of formula (MUV-101).

In one embodiment, $Ti^{IV}$ and $Cu^{II}$ are in a $Ti^{IV}:Cu^{II}$ ratio comprised between 15:85 and 99:1. In another embodiment, $Ti^{IV}$ and $Cu^{II}$ are in a $Ti^{IV}:Cu^{II}_{(1-5)}$ ratio comprised between 15:85 and 50:50.

In still another different embodiment of the method of the invention, the MOF solid being prepared has the formula (MUV-102) $[Ti^{IV}_{(3-w)}M^{II}_{w}O(L)_2X_{(3-w)}]S$ and comprises, in a one-pot synthesis and by post-synthetic transformation, the following stages:

(i) mixing in the polar solvent, S: the Ti(IV) precursor, at least one salt of a divalent metal of formula $CuX_2$ or CuY, and the tricarboxylic ligand L, wherein the Ti(IV) precursor is the Ti(IV) heterometallic MOF solid as defined in the first aspect of the invention, preferably the Ti(IV) heterometallic MOF solid of formula MUV-10, and, next, (ii) heating the reaction mixture at a temperature of less than 100° C. and then cooling to give the MOF solid of formula (MUV-102).

In one embodiment, $Ti^{IV}$ and at least one divalent metal $M^{II}_{(1-5)}$ are in a $Ti^{IV}:M^{II}_{(1-5)}$ ratio comprised between 99:1 and 33:67. In another embodiment, $Ti^{IV}$ and the at least one divalent metal $M^{II}_{(1-5)}$ are in a $Ti^{IV}:M^{II}_{(1-5)}$ ratio comprised between 50:50 and 33:67. In still another embodiment, $Ti^{IV}$ and the at least one divalent metal $M^{II}_{(1-5)}$ are in a $Ti^{IV}:M^{II}_{(1-5)}$ ratio comprised between 50:50 and 15:85.

In a preferred embodiment of these methods, the proportion of Ti(IV) precursor with respect to the divalent metal salt(s) of formula $MX_2$ or MY to be added to the initial mixture (i) may vary between 99:1 and 50:50 according to the MOF material synthesised. This proportion is understood considering Ti(IV) moles in the precursor used with respect to moles of a divalent metal(s) in the divalent metal salt(s) used.

Preferably, in the methods disclosed according to the second aspect of the present invention, in stage (i) the amount of tricarboxylic ligand is added to the mixture all at once with the rest of the components. This means that the amount of ligand present in the reaction medium is in excess from the start of the synthesis. This aspect of the method entails the formation of a substantially different MOF if compared to a slow addition of the same ligand to the mixture. In this last case, the ligand is not found in the same concentrations during the entire process, which implies changes in the kinetics of the system, i.e. in the chemical balance during the synthesis.

In a preferred embodiment, in particular, in the methods for obtaining a MOF solid by means of one-pot synthesis and by direct reaction, in stage (ii) temperatures of less than 150° C. are used, more preferably lower than 140° C., and still more preferably lower than 130° C. Advantageously, the Ti(IV) heterometallic MOF solid can be very efficiently prepared at gram scale using simple precursors. Additionally, it has the advantage that the solid can be isolated in the form of crystals with well-defined morphology in all cases, regardless of the incorporated metals and/or the specific method used.

An additional advantage of the different formulations disclosed herein (multiple combinations of divalent metals with tetravalent titanium) is that they have photocatalytic activity both with ultraviolet radiation and under visible light.

In conclusion, the properties of the new Ti(IV)-M(II) MOF solids can be modulated at will. The Ti(IV)-M(II)$_{(1-5)}$ MOF solids according to the invention can be prepared as crystals on a large scale and have excellent chemical stability. In their structures, heterometallic clusters represent a versatile platform that enables manipulation of their electronic structure and photoactivity simply by choosing the adequate divalent metal, in comparison to other much more complex strategies used involving the functionalisation of the bonding element (the ligand).

A relevant advantage of the present invention is the possibility of incorporating variable percentages of $Ti^{IV}:M^{II}$ to the different materials disclosed without sacrificing their homogeneous distribution throughout the material in any case. The synthesis methods disclosed herein ensure the formation of a single material with a homogeneous distribution of metals, i.e. titanium and at least one divalent metal, at atomic level, which makes it possible to control the physical properties (electronic structure) and catalytic properties of the material, in addition to its chemical stability, much more precisely.

This and other properties intrinsic to crystalline and porous Ti(IV) heterometallic MOF solids make them relevant for use, according to a third aspect of the invention, in the generation of solar fuels, photoactivated degradation, photoreduction of $CO_2$, treatment of waters by degradation of organic pollutants or capture of heavy metals, heterogeneous catalysis, as an electronic component or part of an electronic component and/or as porous or photoactive coatings in ceramic products, paints, plastics and gel-coat for controlling pollutants in an interior atmosphere.

Therefore, the aforementioned drawbacks are resolved by the Ti(IV) heterometallic MOF solid, according to the first aspect of the invention, and with the method of obtainment thereof, according to the second aspect of the invention, in addition to having other advantages that will be disclosed below in the detailed description of the invention.

BRIEF DESCRIPTION OF THE DRAWINGS

In order to better understand the description made, a set of drawings has been provided which, schematically and solely by way of non-limiting example, represent a practical case of embodiment.

DETAILED DESCRIPTION OF THE INVENTION

Figure 1:
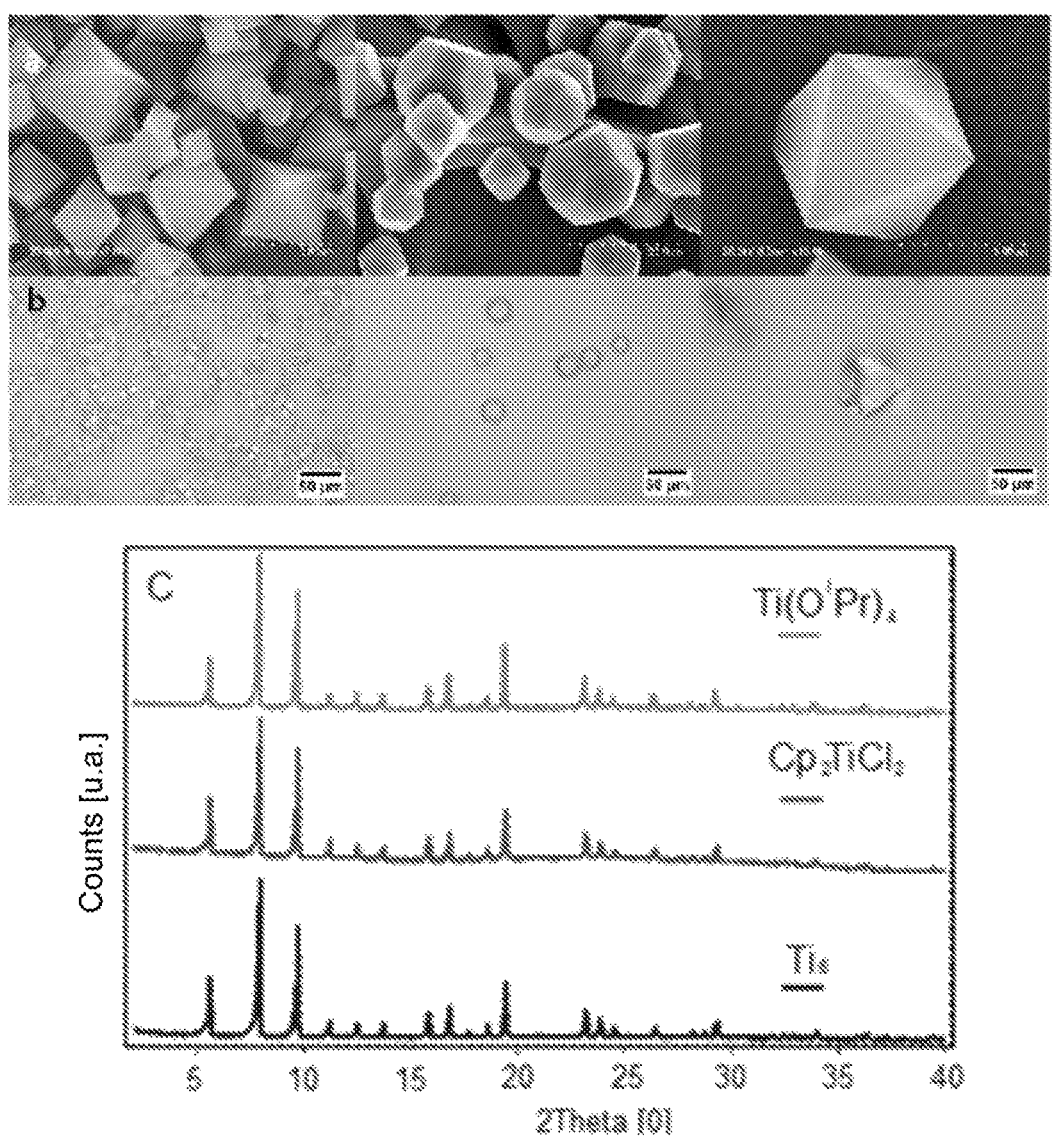
FIG. 1 shows (a) scanning electron microscope (SEM) images and (b) optical microscope images of crystals of the MUV-10 family obtained according to Example 1 and using different titanium (IV) precursors, in particular, from left to right: titanium (IV) isopropoxide [Ti(O$^i$Pr)$_4$], bis(cyclopentadienyl)titanium (IV) dichloride [Cp$_2$TiCl$_2$] and hexanuclear titanium (IV) complex [Ti$_6$], and in (c) X-ray powder diffractograms measured with Cu radiation ($\lambda$=1.5406 Å) in a PANalytical Empyrean diffractometer at 40 mA and 45 kV of the materials obtained with the different precursors, which shows the formation of the same phase of the material in the entire MUV-10 family.

Preferred embodiments of the present invention are disclosed below.

The problem that the present invention aims to address is that of providing new crystalline and porous materials based on Ti(IV) using Ti-M heterometallic clusters as species with controlled reactivity to enable the formation of multiple metal-organic architectures by combining Ti(IV)-M(II) clusters (M=Mg, Ca, Sr, Ba, Ti, V, Cr, Mn, Fe, Co, Ni, Cu, Zn, Cd) and ligands based on low-cost polyaromatic carboxylic acids.

To date this type of materials could not be efficiently generated due to the limitations intrinsic to the synthesis of the titanium MOFs expounded in the background of the invention section. This problem was addressed by the inventors through the use of another metal precursor M(II), in addition to Ti(IV), under certain conditions determined in the synthesis of these materials. This enables the generation of Ti$^{IV}$-M$^{II}$ heterometallic MOFs with high chemical stability that makes it possible to combine both types of metals in the structure in variable proportions to generate multiple combinations and architectures with variable porosity. Ti$^{IV}$-M$^{II}$$_{(1-5)}$ MOF solids can be obtained on a large scale, easily and controlling both crystal size and morphology. Ti$^{IV}$-M$^{II}$$_{(1-5)}$ MOF solids with variable formulations can be generated by directly controlling the proportion of Ti and the other metals in the material. The control is not only limited to binary combinations, but rather titanium can be combined with up to 5 different types of metals in the same material. As opposed to the extrinsic doping methodologies disclosed to date -synthesis of the material and subsequent incorporation of other metals in a second stage—the methods disclosed herein enable the combination of Ti with divalent metals in a single stage, precisely controlling their distribution in the MOF and the desired proportion to precisely control the electronic, catalytic and photoactive properties of the final MOF.

In a preferred embodiment, the Ti$^{IV}$-M$^{II}$$_{(1-5)}$ MOF solids family is prepared using the general formula (MUV-10): [Ti$^{IV}$$_3$M$^{II}$$_3$(O)$_3$L$_4$]S MUV-10 Family These materials have a sodalite-type structure wherein the Ti$^{IV}$-M$^{II}$ heterometallic units are joined together by the trimesic acid to form a three-dimensional neutral network with two types of pores, one with octahedral geometry and another with dodecahedral geometry.

Said $Ti^{IV}$-$M^{II}_{(1-5)}$ solids are prepared by direct reaction of Ti(IV) organometallic precursors, generally using Ti(IV) alkoxides (for example, Ti(IV) isopropoxide, Ti(IV) methoxide, Ti(IV) ethoxide, Ti(IV) n-propoxide, Ti(IV) n-butoxide, Ti(IV) (triethanolaminato)isopropoxide, Ti(IV) tert-butoxide, Ti(IV) oxyacetylacetonate, among others) or other commercial Ti(IV) precursors (Ti(IV) tetrachloride, bis(cyclopentadienyl)-Ti(IV) dichloride, cyclopentadienyl-Ti(IV) trichloride or Ti(IV) oxosulphate), as well as other non-commercial Ti(IV) polynuclear compounds and that are stable at air such as the Ti(IV) hexanuclear complexes; and simple $MX_2$ salts (X=F, Cl, Br, I, $NO_3^-$, $ClO_4^-$, $BF_4^-$, $SON^-$, $OH^-$, acetate or acetylacetonate) or MY (Y=$SO_4^{2-}$, $CO_3^{2-}$) of divalent metals ($M^{II}$=Mg, Ca, Sr, Ba, Ti, V, Cr, Mn, Fe, Co, Ni, Cu, Zn, Cd), such that it makes it possible to maintain the neutrality of the network, with trimesic acid in a stoichiometric ratio of 1:3 in polar solvents with a boiling point of more than 80° C., such as N,N-dimethyl-formamide, N,N-diethylformamide, N,N-dimethylacetamide, N-methyl-2-pyrrolidone, water. An inorganic acid which acts as a crystalline growth modulator is added to said solution in variable proportions, typically between 5 and 500 gram equivalents/mol, depending on the inorganic acid used, and is maintained under stirring until the reagents are completely dissolved.

This reaction mixture is heated at a temperature of more than 80° C. for a period greater than or equal to 24 hours.

Once this time has elapsed, the mixture is cooled to room temperature and the solid obtained is separated by centrifugation, thoroughly washed with organic solvents to remove the material which has not reacted and left to dry in a vacuum all night. The method is adequate for any of the metal precursors described above and can be scaled to produce grams of material in reactors with a volume of up to 1 litre. The resulting MOF is isolated in the form of crystals with well-defined morphologies which can be controlled by temperature, reaction time and proportion of inorganic acid added. Said size may vary from hundreds of nanometres to 250 µm, while the morphology of the crystals may vary from cubic to octahedral, passing through different intermediate morphologies there between (FIG. 1).

Figure 2:
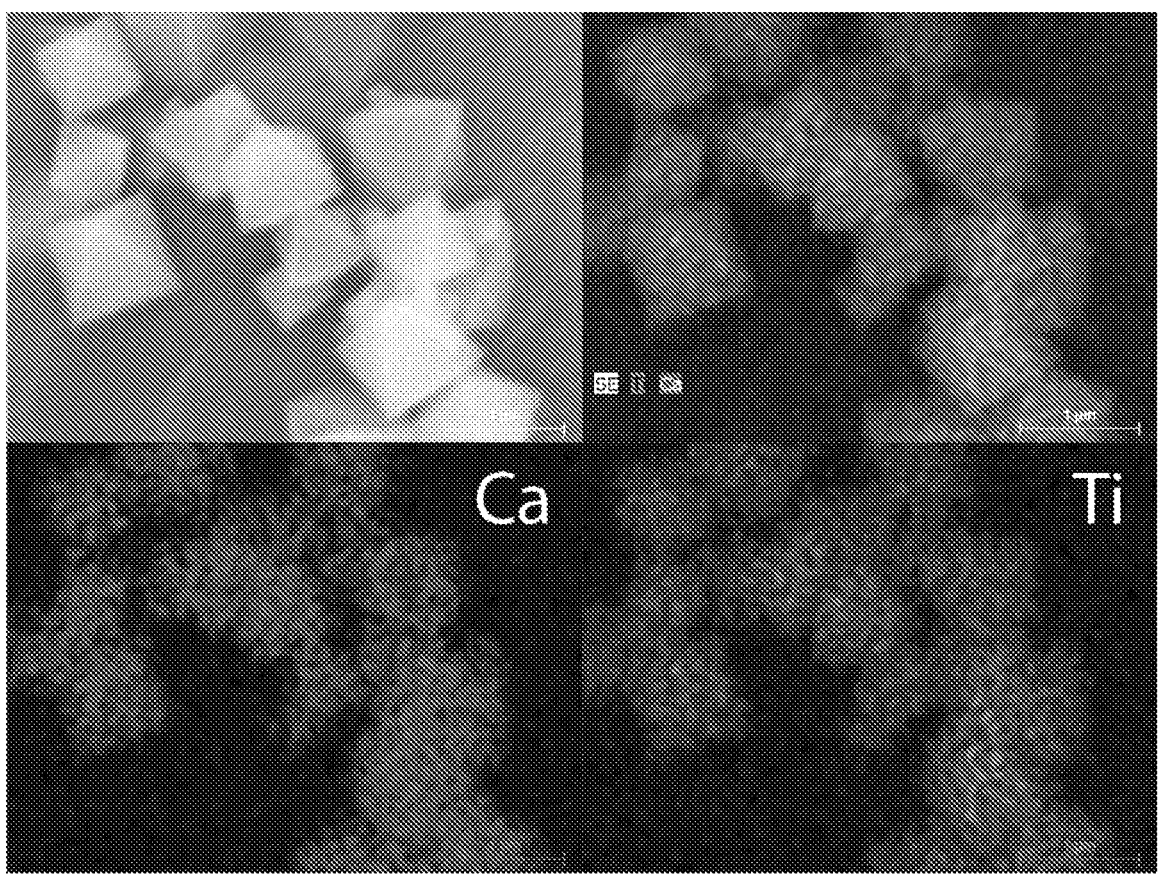
FIG. 2 shows the homogeneous distribution of calcium and titanium metals obtained with an electron microscope throughout the surface of the MUV-10 (Ca) material prepared according to Example 1.

The crystalline structure of the $Ti^{IV}$-$M^{II}_{(1-5)}$ MOF solid and the homogeneous distribution of the metals throughout the crystal is always the same, regardless of the morphology and size of the crystals (FIG. 2).

These $Ti^{IV}$-$M^{II}_{(1-5)}$ MOF solids can be prepared using any type of tricarboxylic ligand, i.e. tricaboxylic $C_6$-aryl acid-type ligands (for example, trimesic acid (1,3,5-benzenetricarboxylic acid)) or tricarboxylic $C_3N_3$-aryl acid-type ligands (for example, 2,4,6-triazine-tricarboxylic acid) and derivatives thereof of the tricarboxylic $(C'_6$-aryl$)_3$-$C_6$-aryl or $(C'_6$-aryl$)_3$-$C_3N_3$-aryl acid type.

The incorporation of different metals to the structure makes it possible to modulate the absorption of radiation to make these systems active under visible light and, consequently, improve their photocatalytic activity.

Figure 3:
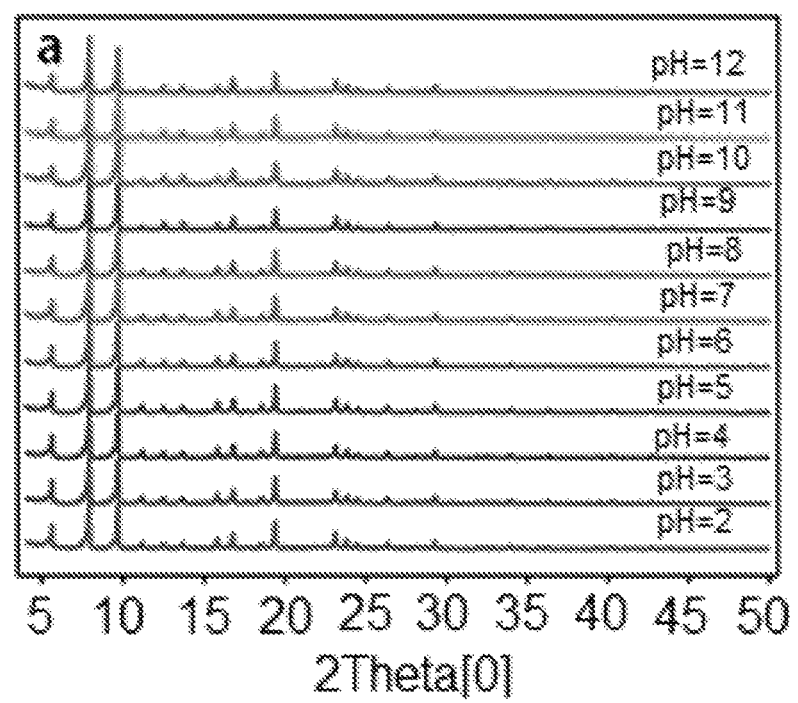
FIG. 3 shows (a) X-ray powder diffractograms of MUV-10 (Ca) after immersion in aqueous solutions at different pH values (from the bottom up: pH=2— pH=12) and (b) N$_2$ adsorption isotherms at 77 K before and after immersion in aqueous solutions with different pH values (from the bottom up: obtained, pH=2, pH=7, pH=12).
Figure 3:
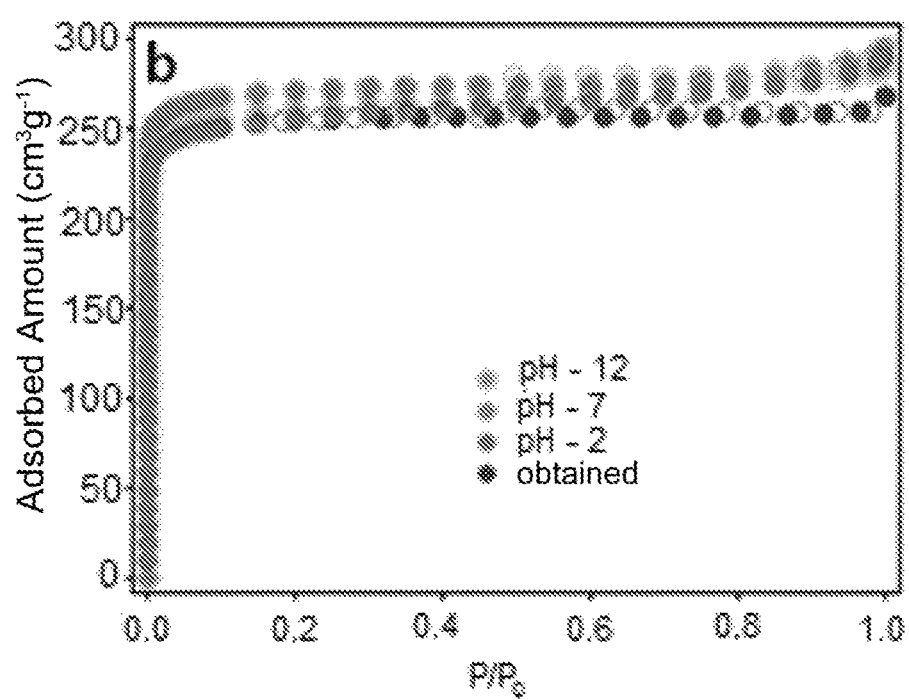

Chemical stability experiments were conducted to verify the resilience of these materials against aqueous solutions at different pH values. All the materials studied were found to be stable in water between pH values comprised between 2 and 12, without observing any sign of degradation in their structure or in their $N_2$ adsorption properties at 77 K with surface areas of close to 1,000 $m^2$/g (FIG. 3).

Mixing the $Ti^{IV}$-$M^{II}_{(1-5)}$ MOF solids with a divalent metal salt solution under adequate reaction conditions also enables the post-synthetic transformation of the structure of the MUV-10 family into other structures (MUV-101, MUV-102 families) with controlled $Ti^{IV}$:$M^{II}$ ratios, as disclosed in the examples below.

In another embodiment, the $Ti^{IV}$-$M^{II}_{(1-5)}$ MOF solids family is prepared using the general formula (MUV-101):
$[Cu^{II}_{(3-2z)}Ti^{IV}_z(L)_2]S$ MUV-101 Family These materials have the same structure as the compound known as HKUST-1, with formula $Cu_3(btc)_2$, wherein btc makes reference to trimesic acid. The main difference lies in the introduction of variable percentages of Ti(IV) replacing the dimetallic units of Cu(II) present in the originally disclosed material.

The preparation of the materials of the MUV-101 family is carried out by direct reaction of Ti(IV) organometallic precursors, such as those disclosed earlier for the MUV-10 family, with trimesic acid in the presence of a simple Cu(II) salt ($CuF_2$, $CuCl_2$, $CuBr_2$, $CuI_2$, $Cu(OAc)_2$ $CuSO_4$, $Cu(NO_3)_2$, $CuCO_3$) in polar solvents such as N,N-dimethylformamide, N,N'-diethylformamide, N,N-dimethylacetamide, N-methyl-2-pyrrolidone, methanol, ethanol, isopropanol, n-propanol, water and at temperatures of more than 100° C.

Once the reaction has finished, the resulting solid is separated by centrifugation and is thoroughly washed with organic solvents and vacuum dried.

Figure 5:
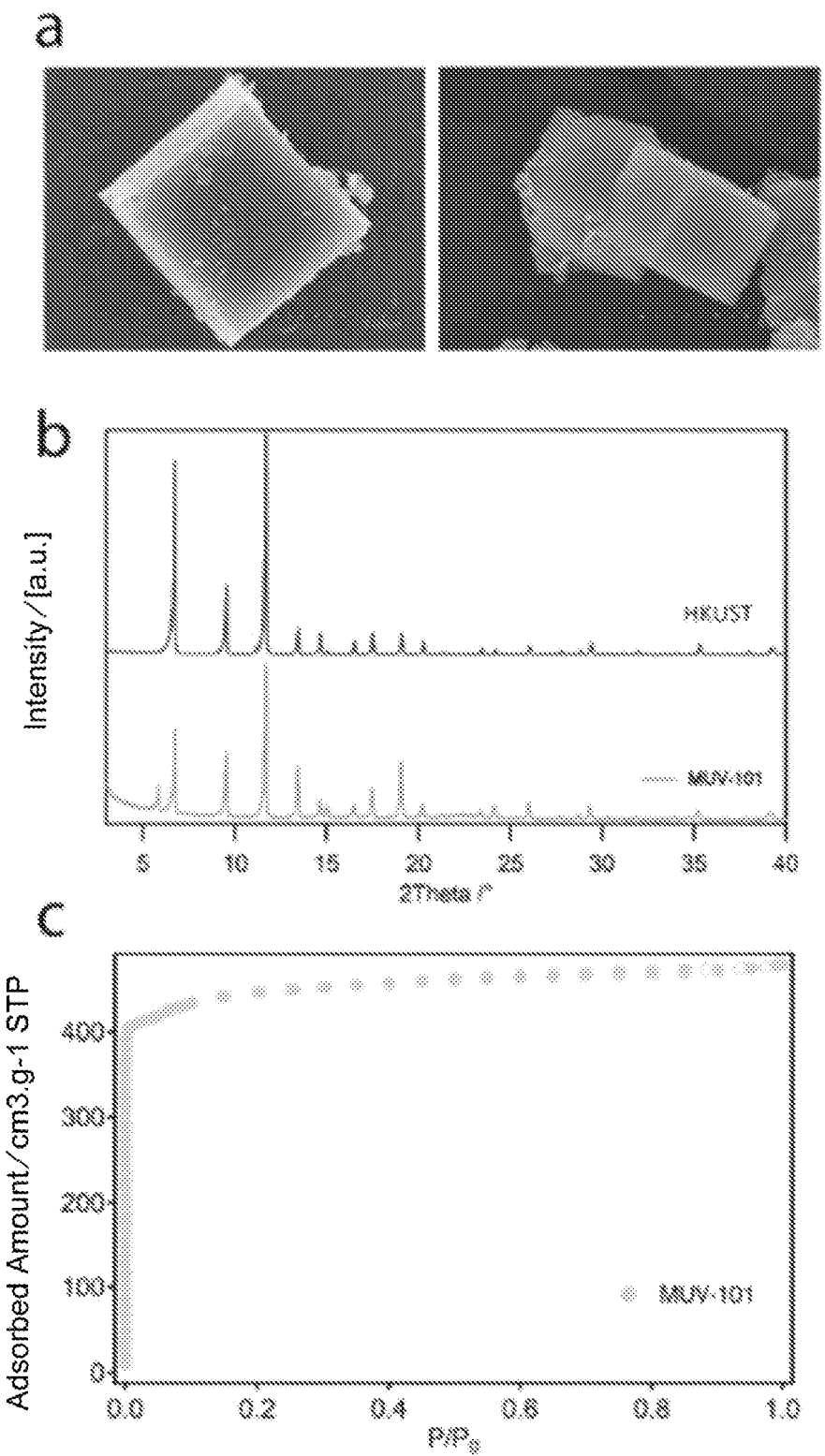
FIG. 5 shows (a) SEM images of the MUV-101 (Ti—Cu) family obtained according to Example 3 or 4, (b) X-ray powder diffraction representative of the MUV-101 family, showing the formation of HKUST-type structures after the incorporation of copper, and (c) comparison of the porosity of different MUV-101 materials with a Ti:Cu proportion in its structure of 15:85.

The resulting family of materials we call MUV-101 are isolated in the form of crystals with cubic morphology, surface areas comprised between 1,000-2,000 $m^2$/g and variable $Ti^{IV}$:$Cu^{II}$ ratios between 99:1 and 15:85 according to the $Ti^{IV}$:$Cu^{II}$ ratio initially used (FIG. 5).

These systems are stable in water in the presence of acid and bases in pH ranges between 1 and 10.

This $Ti^{IV}$-$M^{II}_{(1-5)}$ MOF solid can also be prepared using preformed materials of the MUV-family based on Ti(IV) and M(II) as precursors.

These are subjected to a post-synthetic transformation method, not disclosed to date, in the presence of simple $Cu^{II}$ salts ($CuF_2$, $CuCl_2$, $CuBr_2$, $CuI_2$, $Cu(OAc)_2$ $CuSO_4$, $Cu(NO_3)_2$,
$CuCO_3$) using different polar solvents such as N,N-dimethylformamide, N,N'-diethylformamide, N,N-dimethylacetamide, N-methyl-2-pyrrolidone, methanol, ethanol, isopropanol, n-propanol, water, at temperatures below 100° C.

Once the reaction has finished, the new material is isolated by centrifugation, washed with the solvent and vacuum dried.

The MUV-101 family of materials thus synthesised are isolated in the form of crystals with cubic morphology, cubic surface areas comprised between 1,000-2,000 $m^2$/g and variable $Ti^{IV}$:$Cu^{II}$ ratios between 99:1 and 15:85 according to the time and reaction temperature.

In another embodiment, the $Ti^{IV}$-$M^{II}_{(1-5)}$ MOF solids family is prepared using the general formula (MUV-102):
$[Ti^{IV}_{(3-w)}M^{II}_wO(L)_2X_{(3-w)}]S$ MUV-102 Family The materials have the same zeolite-type structure with MTN topology disclosed earlier for the MIL-100 MOF family. As opposed to these, the materials of the invention incorporate $Ti^{IV}$-$M^{II}$ heterometallic clusters, replacing the disclosed homometals M(III) (M=Cr, Al, Fe).

The MOF solids of this family have the general formula included above. The heterometallic clusters are connected by trimesate ligands to form a porous three-dimensional network with two pore sizes having a diameter of 2.4 and 2.9 nm. As in the case of the MUV-10 family, these materials can be prepared by direct reaction of the Ti(IV) organometallic precursors and simple $MX_2$ or MY divalent metal salts with trimesic acid in polar solvents with a boiling point of more than 80° C., such as N,N'-dimethylformamide, N,N-diethylformamide, N,N'-dimethylacetamide, N-methyl-2-pyrrolidone, water.

An inorganic acid which acts as a crystalline growth modulator is added to said solution in variable proportions, typically between 5 and 500 gram equivalent/mol, depending on the inorganic acid used, and is maintained under stirring until the reagents are completely dissolved.

This reaction mixture is heated at a temperature of more than 80° C. for a period greater than or equal to 48 hours. Once this time has elapsed, the mixture is cooled to room temperature and the solid obtained is separated by centrifugation, thoroughly washed with organic solvents to remove the material which has not reacted and left to dry in a vacuum all night.

The method is adequate for any of the metal precursors described above and can be scaled to produce grams of material in reactors with a volume of up to 1 litre.

Figure 6:
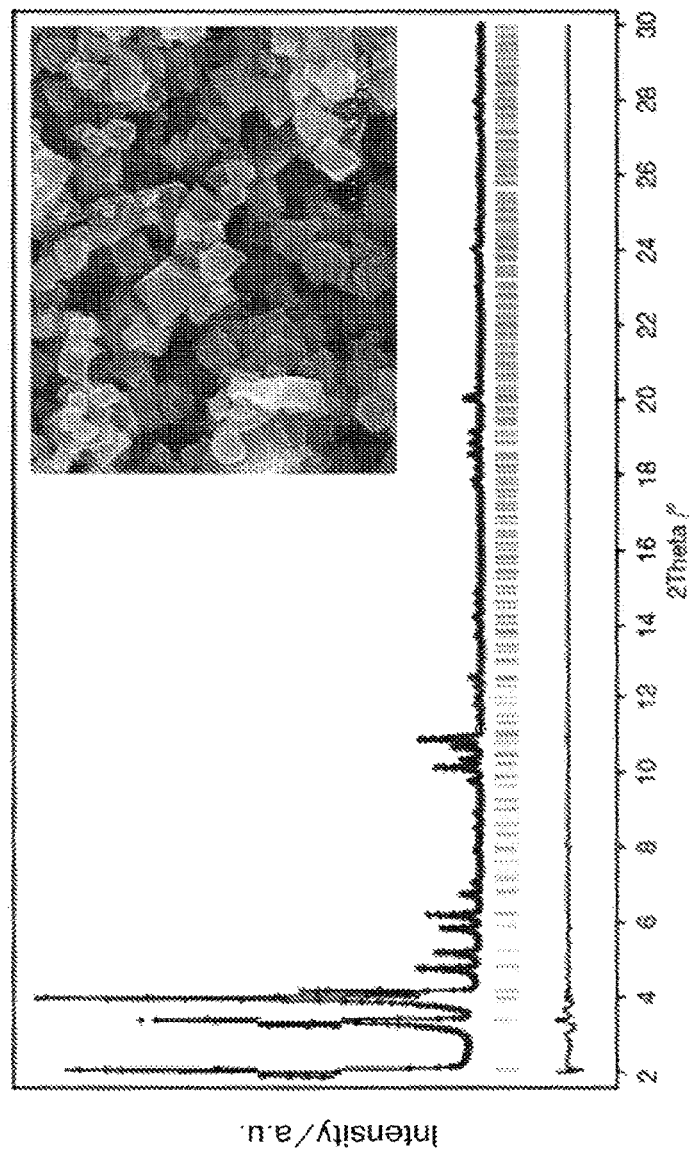
FIG. 6 shows the refinement of the X-ray powder diffractogram of a material of the MUV-102 (Ti—Fe) family obtained according to Example 5 or 6 using the LeBail method, which shows the formation of MNT-type zeolite structures. The table below shows the representative morphology of the crystals of these materials.
Figure 7:
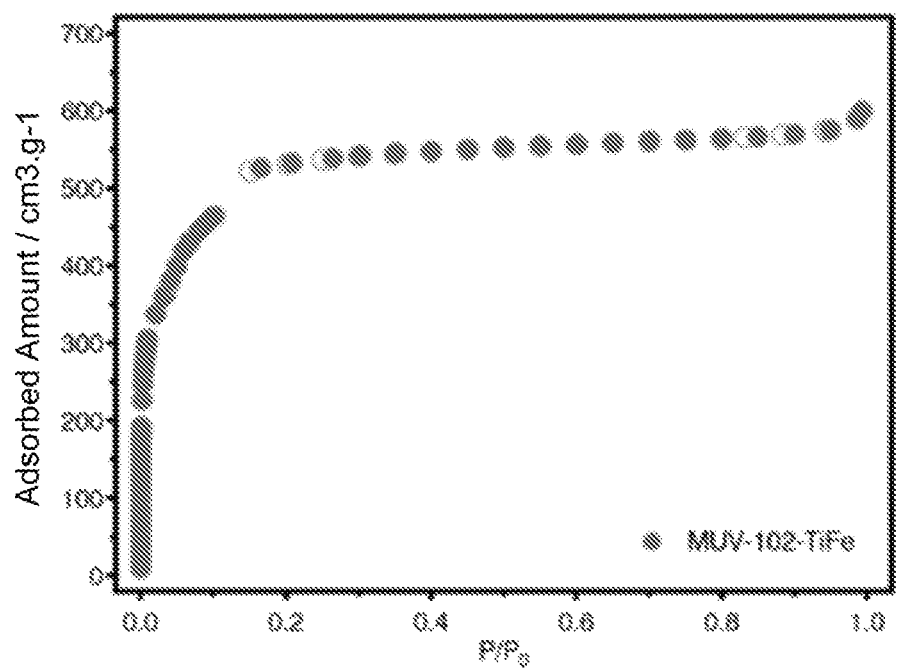
FIG. 7 shows the N$_2$ adsorption isotherm at 77 K of the MUV-102 (Ti—Fe) material obtained according to Example 5 or 6.
Figure 8:
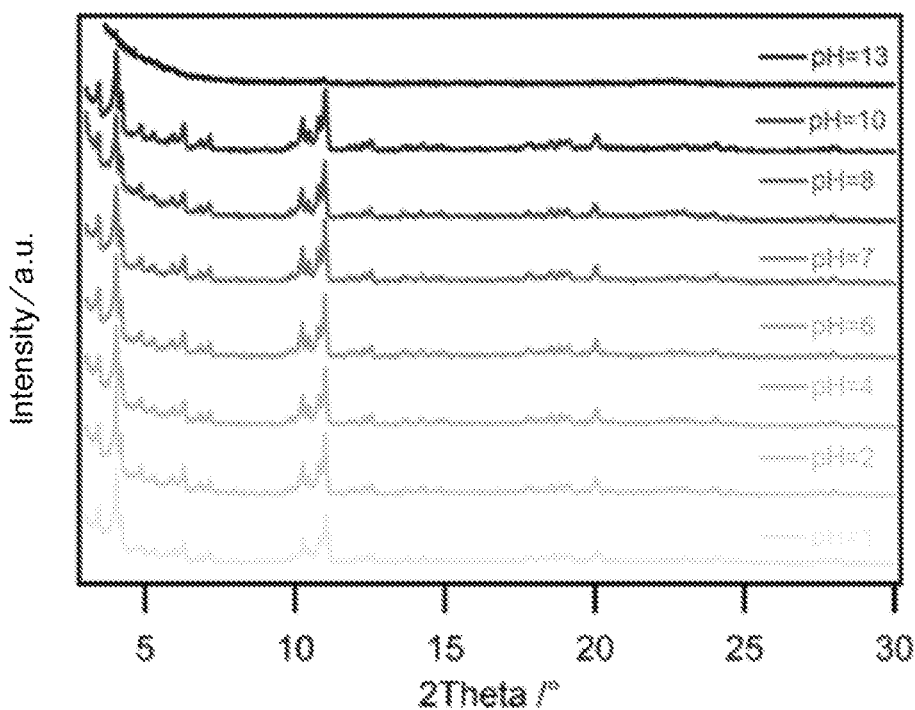
FIG. 8 shows different X-ray powder diffractograms after immersion in aqueous solutions at different pHs (from the bottom up: pH=1, 2, 4, 6, 7, 8, 10 and 13) of the MUV-102 (Ti—Fe) materials obtained according to Example 5 or 6, which shows their chemical stability against acids and bases.

The resulting family of materials we call MUV-102 are isolated in the form of crystals with octahedral morphology, variable $Ti^{IV}:M^{II}$ ratios between 99:1 and 33:67 according to the used (FIG. 6), with surface areas close to 2,000 $m^2.g^{-1}$ in all cases (FIG. 7). FIG. 8 shows the stability results representative for one of the materials of the family that confirm its structural stability in aqueous solutions in pH ranges between 1 and 10, like the MUV-101 family.

These materials can also be prepared by post-synthetic transformation of the MUV-10 family similarly to the MUV-101 family disclosed above. In this method, heterometallic MOFs of the family based on $Ti^{IV}-M^{II}$ are suspended in a solution of a simple salt $MX_2$ or MY of divalent metals in polar solvents such as N,N-dimethylformamide, N,N'-diethylformamide, N,N'-dimethylacetamide, N-methyl-2-pyrrolidone, methanol, ethanol, isopropanol, n-propanol, water, at temperatures below 100° C.

Once the reaction has finished, the material is separated by centrifugation and thoroughly washed with the organic solvent used, in order to remove the non-reacted residues.

Figure 9:
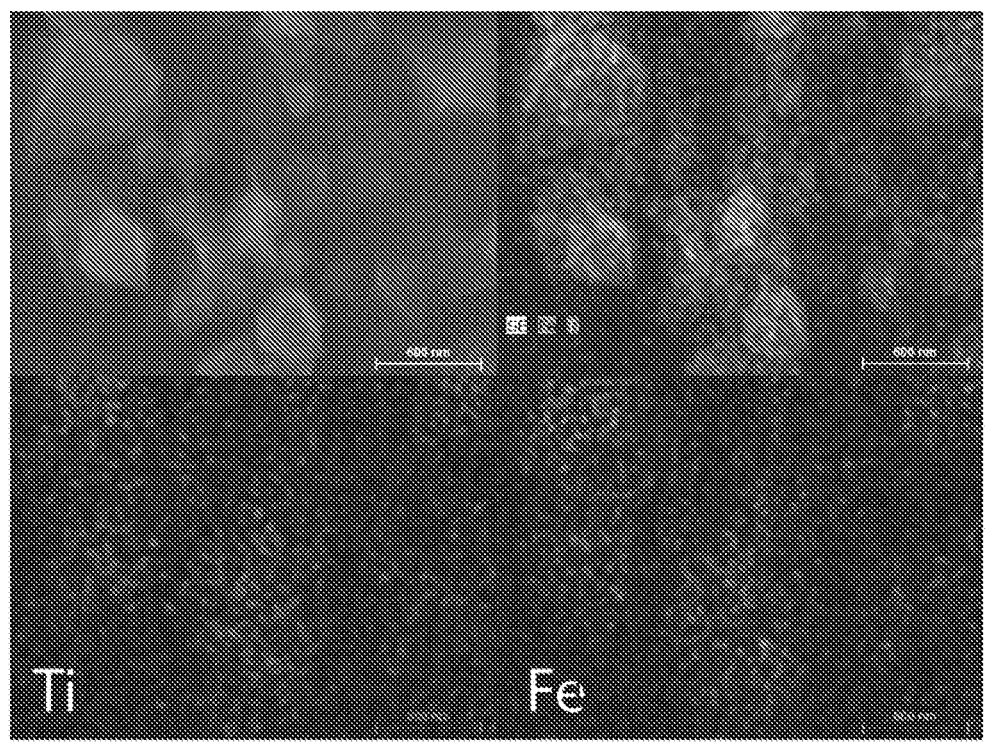
FIG. 9 shows the homogeneous distribution of iron and titanium metals obtained with the electron microscope throughout the surface of the MUV-102 (Ti—Fe) material prepared according to Example 5 or 6.

Once again, the resulting MUV-102 MOF solids are isolated as particles with octahedral morphology and with variable $Ti^{IV}:M^{II}$ ratios between 99:1 and 33:67, according to reaction time and temperature, and with the concentration of the solution of the metal used. As opposed to the post-synthetic metal exchange methodologies disclosed earlier, this post-synthetic transformation ensures a homogeneous distribution of the metals throughout the crystal (FIG. 9).

As disclosed in the descriptive part of the invention, systems integrated by Ti(IV) heterometallic MOF solids of the invention have the following advantages:

Use of Ti(IV) heterometallic clusters as a structural unit of the MOF.

Ti(IV) heterometallic MOF solids with variable formulations through the direct control of the proportion of Ti(IV) and other divalent metals that form the structural unit of the MOF.

Up to five types of different divalent metals in addition to titanium with homogeneous distribution at atomic level in the MOF.

Precise control over the distribution of the metals in the MOF and the desired proportion of $Ti^{IV}-M^{II}$ for severe control over the electronic, catalytic and photoactive properties of the final MOF material.

Control of the morphology and size of the Ti(IV) heterometallic MOF solid, essential for the adequate dispersal of the MOFs in organic solvents and processing in the manufacture of functional coatings.

One-pot synthesis methods by direct reaction with multiple metal precursors and/or by post-synthetic transformation of a titanium heterometallic MOF solid defined in the invention. In both cases, the synthesis method is easily scalable at reactor sizes of at least one litre in volume.

Intrinsic doping in a single stage and using cheaper precursors for obtaining titanium heterometallic MOFs.

Improved photocatalytic activity under visible light.

High chemical stability. The Ti(IV) heterometallic MOF solids remain intact when immersed in water, even in the presence of acids or bases (range of pH 2-12), without this treatment affecting its crystalline structure or its properties.

EXAMPLES

Example 1: Synthesis of MUV-10(Ca)

125 mg of trimesic acid (595 μmol) are dissolved in a mixture of 12 mL of N,N-dimethyl-formamide (DMF) and 3.5 mL of acetic acid. 36 μL of Ti(IV) isopropoxide [Ti(O$^i$)Pr)$_4$] (120 μmol) and 26 mg of calcium chloride (120 μmol) are added to this solution under an inert atmosphere and in the absence of humidity. The mixture is stirred until the complete dissolution of the reagents and heated in an oven at 120° C. for 48 hours. Once this time has elapsed, the solid obtained is separated by centrifugation, washed with corresponding portions of DMF and methanol, and vacuum dried.

The same previous methodology was repeated, except that in this case bis-cyclopentadienyltitanium (IV) dichloride [Cp$_2$TiCl$_2$] was added instead of titanium (IV) isopropoxide.

The same previous methodology was repeated, except that in this case hexanuclear titanium (IV) [Ti$_6$] complex was added instead of bis-cyclopentadienyltitanium (IV).

The different morphologies, homogeneous distribution of metals, crystallinity and chemical stability of the MUV-10 family of materials are shown in FIGS. 1, 2 and 3.

Example 2: Synthesis of MUV-10 (Ca+Mn)

125 mg of trimesic acid (595 μmol) were dissolved in a mixture of 12 mL of N,N-dimethyl-formamide (DMF) and 3.5 mL of acetic acid. 36 μL of Ti(IV) isopropoxide [Ti(Oi)Pr)$_4$] (120 μmol) and an equimolar amount of divalent metal salts were added to this solution: 13 mg of calcium chloride (60 μmol) and 12 mg of manganese chloride (60 μmol) under an inert atmosphere and in the absence of humidity. The mixture was stirred until the complete dissolution of the reagents and heated in an oven at 120° C. for 48 hours. Once this time had elapsed, the solid obtained was separated by centrifugation, washed with corresponding portions of DMF and methanol and vacuum dried.

Figure 4:
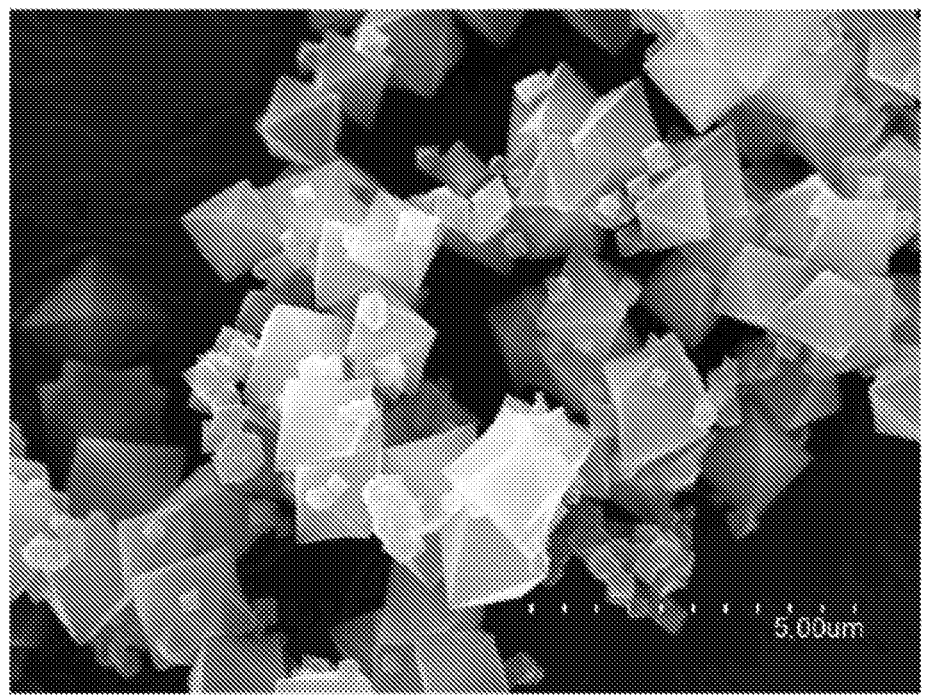
FIG. 4 shows (a) scanning electron microscope (SEM) images of the MUV-10 family obtained according to Example 2 and using different divalent metal salts, Ca and Mn; and (b) the composition of the metals present in the MOF determined by Energy-Dispersive X-ray Spectrometry (EDX) measured at 20 kV on our metals with a mixture of Au—Pd for 90 s. This composition corresponds to a Ti(IV):M(II) proportion of 1:1 and, therefore, an equimolar composition of divalent metals Ca and Mn.
Figure 4:
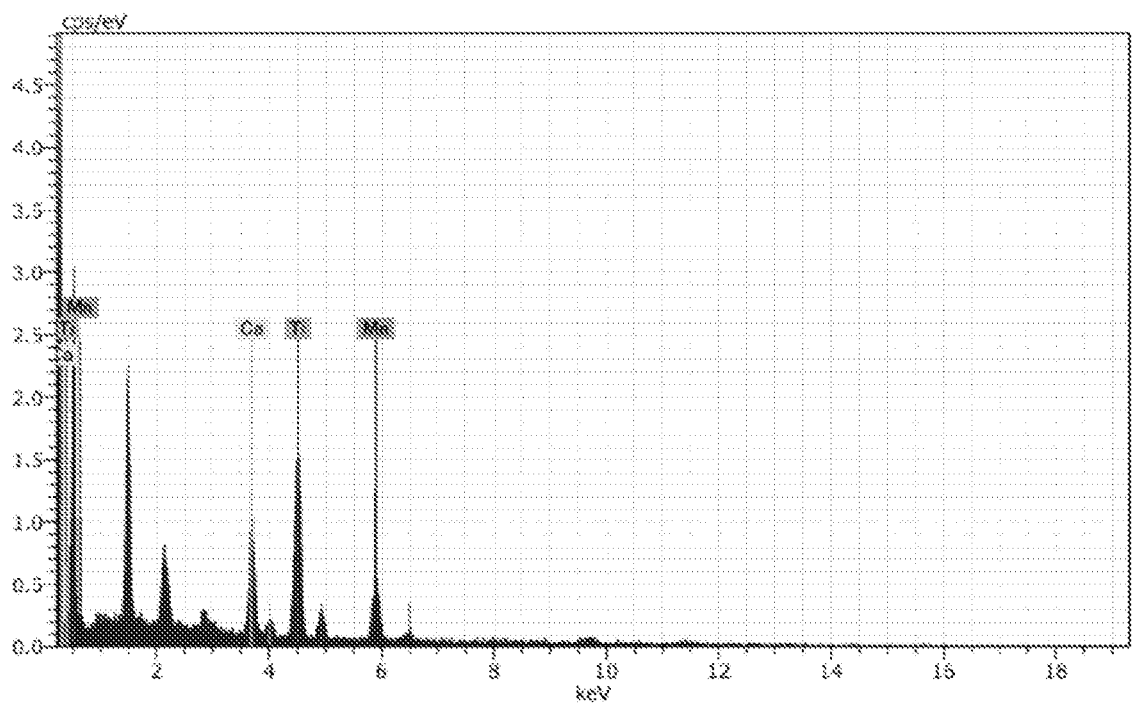

Scanning electron microscopy (SEM) photographs were taken of the MOF obtained, whose homogeneous morphology and homogeneous distribution of the metals can be observed in FIG. 4(a). The composition of the metals present in the sample was determined by X-ray energy-dispersive spectrometry (EDX). EDX was used to verify the existence of an equimolar composition of the divalent metals Ca and Mn corresponding to a Ti(IV):M(II) proportion of 1:1 in the MOF.

The data obtained from the EDX trial, also represented in FIG. 4(b), are shown below:

Spectrum: 1

| Element | Normalised atomic percentage (p %) | Normalised atomic percentage (atomic %) | Error (p %) |
| --- | --- | --- | --- |
| Titanium | 51.26 | 50.98 | 0.6 |
| Calcium | 21.09 | 25.06 | 0.3 |
| Manganese | 27.65 | 23.96 | 0.4 |
| Total | 100.00 | 100.00 | |

The results obtained in the table demonstrate the presence of three different metals in a single MOF with homogeneous distribution.

Example 3: Synthesis of MUV-101 Ti—Cu by Direct Reaction 125 mg of trimesic acid (595 μmol) are dissolved in a mixture of 12 mL of N,N-dimethyl-formamide (DMF) and 3 mL of acetic acid. 17 μL of Ti(IV) isopropoxide (54 μmop and 41 mg of Cu(II) chloride (306 μmop are added to this solution. The mixture is stirred until the complete dissolution of the reagents and heated in an oven at 120° C. for 48 hours. Once this time has elapsed, the solid obtained is separated by centrifugation, washed with corresponding portions of DMF and methanol, and vacuum dried.

Example 4: Synthesis of MUV-101 Ti—Cu by Post-Synthetic Transformation (PST) of MUV-10

100 mg of MUV-10(Ca) are suspended in 10 mL of a solution of 0.005 M of Cu(II) chloride in a mixture of DMF:NMP 1:1. The mixture is introduced in an oven preheated at 65° C. for a maximum period of 15 days. Once this time has elapsed, the solid obtained is separated by centrifugation, washed with corresponding portions of DMF and methanol, and vacuum dried.

The morphology, crystallinity and porosity of the MUV-101 family of materials is shown in FIG. 5.

Example 5: Synthesis of MUV-102 Ti—Fe by Direct Reaction 125 mg of trimesic acid (595 μmol) are dissolved in a mixture of 12 mL of N,N-dimethyl-formamide (DMF) and 3 mL of acetic acid. 36 μL of Ti(IV) isopropoxide (120 μmop and 48 mg of Fe(II) chloride (240 μmop are added to this solution in a dry box or in the absence of oxygen. The mixture is stirred until the complete dissolution of the reagents and heated in an oven at 120° C. for 48 hours. Once this time has elapsed, the solid obtained is separated by centrifugation, washed with corresponding portions of DMF and methanol, and vacuum dried.

Example 6: Synthesis of MUV-102 Ti—Fe by Post-Synthetic Transformation (PST) of MUV-10

100 mg of MUV-10(Ca) are suspended in 10 mL of a solution of 0.005 M of Fe(II) chloride in a mixture of DMF:NMP 1:1 in the absence of oxygen. The mixture is introduced in an oven preheated at 65° C. for a maximum period of 10 days. Once this time has elapsed, the solid obtained is separated by centrifugation, washed with corresponding portions of DMF and methanol, and vacuum dried.

The morphology, crystallinity, chemical stability and homogeneous distribution of metals of the MUV-102 family of materials are shown in FIGS. 6, 7, 8 and 9.

Example 7: Application of MUV-10(Ca) and MUV-10 (Mn) for Generating $H_2$

Figure 10:
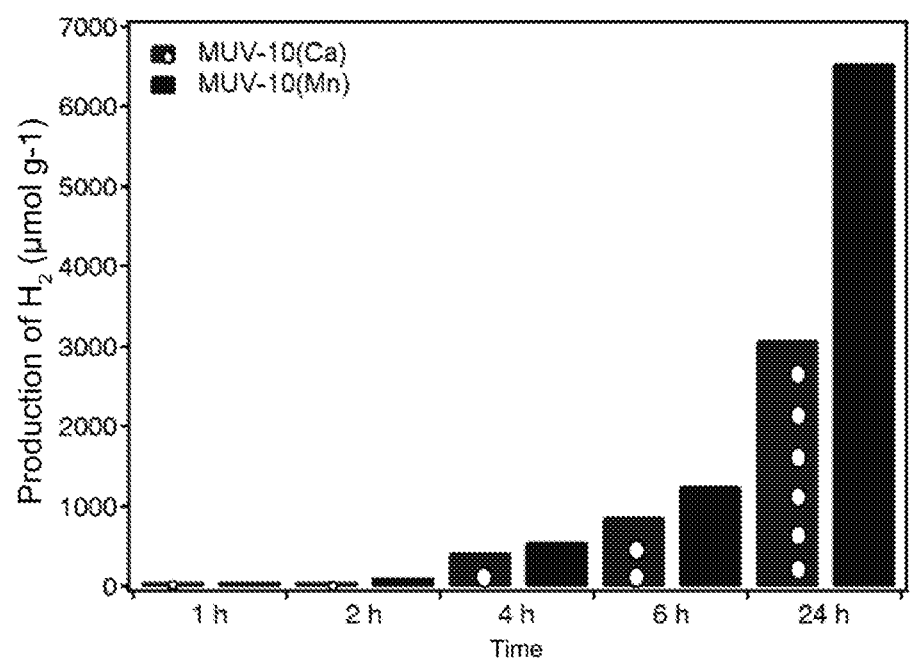
FIG. 10 shows a bar chart representing the amount of H$_2$ produced per gram for each of the MOFs: MUV-10(Ca) and MUV-10(Mn) in relation to time.

The photocatalytic activity of two different MUV-10, MUV-10 (Ca) and MUV-10 (Mn), was assessed for the generation of fuels under visible radiation. To this end, a suspension of each MOF in a mixture of $H_2O$:MeOH (4:1) was irradiated with a Xenon lamp (300 W). The results obtained relative to the amount of $H_2$ generated per gram of material are shown in FIG. 10.

Study of the Properties of the MUV-10 Solid

The distribution of pore size obtained from $N_2$ adsorption isotherms confirmed a homogeneous pore diameter of 10.3 Å, which is consistent with the theoretical value of 12.0 Å calculated from the structure.

The hydrolytic stability of the material between pH 2 and 12 was analysed. In accordance with the refinement of the diffraction pattern and $N_2$ adsorption measurements, the immersion of the MUV-10(Ca) solid in concentrated solutions of HCl and $NaOH_{(aq)}$ for 24 hours did not affect its crystallinity or its surface area.

In addition to its chemical stability, the photoactivity of the MOFs of the invention under ultraviolet (UV) light was also studied. To this end, the electronic structure of MUV-10(Ca) was computationally calculated using the density functional theory (DFT). In accordance with its density of states diagram, this $Ti^{IV}$—$Ca^{II}$ MOF is a semi-conductor with a band gap of 3.1 eV, consistent with the optical band gap estimated using diffuse reflectance spectroscopy. As in other MOFs of the state of the art, the conduction band (CB) is dominated by the 3d orbitals of the Ti, while the valence band (VB) is mainly populated by the 2p orbitals of the carbon and oxygen atoms in the aromatic ligand. To test the photoactivity of MUV-10(Ca), the solid suspended in deoxygenated tetrahydrofuran (THF) was irradiated with UV-B radiation (λ=280-315 nm). This gave rise to a change in colour, from white to dark brown, in less than 2 hours. This change remained stable over time and was reverted immediately after exposure of the solid to air. The electron paramagnetic resonance (EPR) spectrum of MUV-10(Ca) before and after the irradiation confirmed the presence of two signals exclusively for the irradiated sample. A wide signal at 0.35 T with parameters g adjusted to $g_{||}$=1.975 and $g_⊥$=1.946, characteristic of the species Ti(III), and a narrower signal better defined to the lower fields with g=2.00, which can be attributed to the formation of photoexcited radicals of the trimesate ligand. This fact confirmed that the photoreduction of titanium in the MOF occurs through the generation of an excited state of the ligand that transfers the charge to the Ti(IV) centres in the MOF metal clusters by means of a ligand-metal charge transfer mechanism.

The photoactivity under visible light of the heterometallic MOFs of the invention that incorporate metals with d electrons in their valence layer to improve their photoactivity under visible light. To this end, a MUV-10(Mn) solid was prepared by direct reaction following the same methodology as for a MUV-10(Ca) solid, detailed in the examples. In accordance with theoretical calculations (equivalent to those detailed above for the same material with Ca), the incorporation of Mn to the material significantly reduces the band gap (2.6 eV) as a result of the introduction of d electrons to the conduction band. Next, the activity of the MUV-10(Mn) solid under visible light was demonstrated. To this end, the activity of the MOF solid as a photocatalyst for generating $H_2$ was studied. A suspension of the solid in a mixture of $H_2O:CH_3OH$ was irradiated with a xenon lamp (300 W), confirming that the MUV-10(Mn) phase produces 6,500 $\mu mol/g^1$ of $H_2$, more than double the amount generated by the material MUV-10(Ca), after 24 hours of irradiation, without altering the structure or porosity of the solid. This fact confirms the possibility of modifying the electronic structure and photoactivity of the solid by adequately choosing the metals incorporated to its structure. Despite the fact that reference has been made to a specific embodiment of the invention, it is evident to a person skilled in the art that the solvent type or the titanium (IV) precursor, for example, inter alia, are susceptible of variations and modifications, and that the aforementioned details can be replaced with other technically equivalent ones, without falling outside the scope of protection defined by the attached claims.

The invention claimed is:

1. A crystalline and porous Ti(IV) heterometallic MOF solid, characterised in that it comprises a ligand L of the general structure of:

Compound (A):

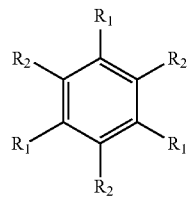

wherein
$R_1$=—COOH; and
$R_2$=—H, —$(CH_2)_{0-5}$—$CH_3$, —$NH_2$, —OH, —$NO_2$, —COOH or halogen; or Compound (B):

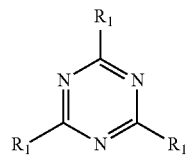

wherein
$R_1$=—COOH;
as the organic part of the MOF, and $Ti^{IV}$ with at least one, and up to 5 divalent metals ($M^{II}$) in the structural unit as the inorganic part of the MOF, wherein $Ti^{IV}$ and the at least one, and up to 5 divalent metals ($M^{II}$) divalent metal $M^{II}_{(1-5)}$ are homogeneously distributed at atomic level, and wherein the MOF solid also includes at least one polar solvent S molecule selected from N,N'-dimethylformamide, N,N'-diethylformamide, N,N'-dimethylacetamide, N-methyl-2-pyrrolidone, methanol, ethanol, isopropanol, n-propanol, water and mixtures thereof.

2. The Ti(IV) heterometallic MOF solid, according to claim 1, wherein the inorganic part includes a proportion of titanium less than or equal to 50%, with divalent metal(s) making up the remaining part until 100%.

3. The Ti(IV) heterometallic MOF solid, according to claim 1, wherein the proportion of titanium is comprised between 50% and 15%, with divalent metal(s) making up the remaining part until 100%.

4. The Ti(IV) heterometallic MOF solid, according to claim 1, wherein $Ti^{IV}$ and the at least one, and up to 5 divalent metals ($M^{II}$) jointly form a metal cluster interconnected with the ligand L to give a crystalline and porous three-dimensional structure.

5. The Ti(IV) heterometallic MOF solid, according to claim 1, wherein:
the at least one divalent, and up to 5 metals ($M^{II}$) are each independently selected from, $mg^{2+}$, $ca^{2+}$, $sr^{2+}$, $Ba^{2+}$, $Ti^{2+}$, $v^{2+}$, $cr^{2+}$, $Mn^{2+}$, $Fe^{2+}$, $Co^{2+}$, $Ni^{2+}$, $cu^{2+}$, $zn^{2+}$ or $cd^{2+}$.

6. A Ti(IV) heterometallic MOF solid comprising a ligand selected from
Compound (A):

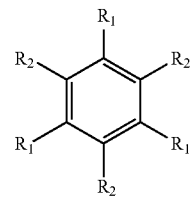

wherein
$R_1$=—COOH; and
$R_2$=—H, —$(CH_2)_{0-5}$—$CH_3$, —$NH_2$, —OH, —$NO_2$, —COOH or halogen; or Compound (B):

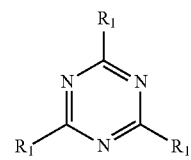

wherein
$R_1$=—COOH,
as the organic part of the MOF, and $Ti^{IV}$ with at least one, and up to 5 divalent metals ($M^{II}$) in the structural unit as the inorganic part of the MOF, wherein $Ti^{IV}$ and the at least one, and up to 5 divalent metals ($M^{II}$) are homogeneously distributed at atomic level, and wherein the MOF solid also includes at least one polar solvent S molecule selected from N,N'-dimethylformamide, N,N'-diethylformamide, N,N'-dimethylacetamide, N-methyl-2-pyrrolidone, methanol, ethanol, isopropanol, n-propanol, water and mixtures thereof.

7. The Ti(IV) heterometallic MOF solid, according to claim 6, wherein the ligand L is 1,3,5-benzenetricarboxylic acid.

8. The Ti(IV) heterometallic MOF solid, according to claim 1, wherein the MOF solid has the general formula (MUV-10):
$[Ti^{IV}_3M^{II}_3(O)_3L_4]S$, and
each of $M^{II}$ is independently a $Mg^{2+}$, $Ca^{2+}$, $Sr^{2+}$, $Ba^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$ or $Cd^{2+}$ cation.

9. The Ti(IV) heterometallic MOF solid, according to claim 8, wherein $Ti^{IV}$ and the at least one and up to 5 divalent metals ($M^{II}$) are in a ratio between 50:50 and 99:1.

10. The Ti(IV) heterometallic MOF solid, according to claim 1, wherein the MOF solid has the general formula (MUV-101):

$[Cu^{II}_{(3-2z)}Ti^{IV}_z(L)_2]S$ wherein:

z is a rational number comprised between a value greater than 0 and less than 1.5;

L is a ligand having the general structure of Compound (A):

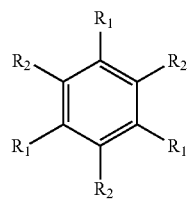

wherein $R_1$=—COOH; and $R_2$=—H, —$(CH_2)_{0-5}$—$CH_3$, —$NH_2$, —OH, —$NO_2$, —COOH or halogen; or Compound (B):

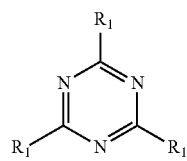

wherein $R_1$=—COOH;

and

S is at least one molecule of N,N'-dimethylformamide, N,N'-diethylformamide, N,N'-dimethylacetamide, N-methyl-2-pyrrolidone, methanol, ethanol, isopropanol, n-propanol, water or mixtures thereof.

11. The Ti(IV) heterometallic MOF solid, according to claim 10, wherein $Ti^{IV}$ and $Cu^{II}$ are in a ratio between 15:85 and 99:1.

12. The Ti(IV) heterometallic MOF solid, according to claim 1, wherein the MOF solid has the general formula (MUV-102):

$[Ti^{IV}_{(3-w)}M^{II}_wO(L)_2X_{(3-w)}]S$ wherein:

w is a rational number comprised between a value greater than 0 and less than 3;

X is, independently, a $F^-$, $Cl^-$ or $OH^-$ anion;

each of $M^{II}$ is independently a $Mg^{2+}$, $Ca^{2+}$, $Sr^{2+}$, $Ba^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$ or $Cd^{2+}$ cation;

L is a ligand having the general structure of Compound (A):

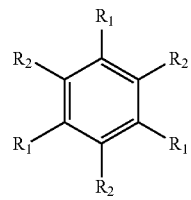

wherein $R_1$=—COOH; and $R_2$=—H, —$(CH_2)_{0-5}$—$CH_3$, —$NH_2$, —OH, —$NO_2$, —COOH or halogen; or Compound (B):

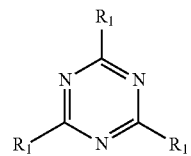

wherein $R_1$=—COOH;

and

S is at least one molecule of N,N'-dimethylformamide, N,N'-diethylformamide, N,N'-dimethylacetamide, N-methyl-2-pyrrolidone, methanol, ethanol, isopropanol, n-propanol, water or mixtures thereof.

13. The Ti(IV) heterometallic MOF solid, according to claim 12, wherein $Ti^{IV}$ and the at least one and up to 5 divalent metals ($M^{II}$) are in a ratio comprised between 99:1 and 33:67.

14. A method for synthesising a crystalline and porous Ti(IV) heterometallic MOF solid, according to claim 6, characterised in that intrinsic doping of Ti(IV) and at least one and up to 5 divalent metals ($M^{II}$) is carried out by one-pot synthesis as follows:

(i) mixing:

a polar solvent, S:

a Ti(IV) precursor, at least one salt of a divalent metal of formula $MX_2$ or MY, wherein:

M is $Mg^{2+}$, $Ca^{2+}$, $Sr^{2+}$, $Ba^{2+}$, $Ti^{2+}$, $V^{2+}$, $Cr^{2+}$, $Mn^{2+}$, $Fe^{2+}$, $Co^{2+}$, $Ni^{2+}$, $Cu^{2+}$, $Zn^{2+}$ or $Cd^{2+}$;

X is $F^-$, $Cl^-$, $Br^-$, $I^-$, $NO_3^-$, $ClO_4^-$, $BF_4^-$, $SCN^-$, $OH^-$, $CH_3COO^-$ or $C_5H_7O_2^-$,

Y is $SO_4^{2-}$ or $CO_3^{2-}$, a ligand L having the structure of Compound (A):

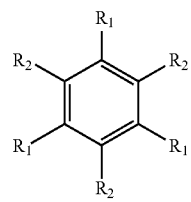

wherein

R$_1$=—COOH; and

R$_2$=—H, —(CH$_2$)$_{0-5}$—CH$_3$, —NH$_2$, —OH, —NO$_2$, —COOH or halogen; or

Compound (B):

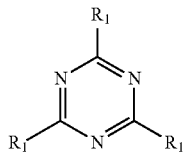

wherein

R$_1$=—COOH, wherein the stoichiometric relationship between the at least one divalent metal salt and the ligand is comprised between 1:1 and 1:6, and, optionally, an inorganic acid or an acid selected from the group consisting of formic acid, acetic acid, propanoic acid, benzoic acid, and derivatives thereof in a molar relationship comprised between 5 and 500 gram equivalent/mole of salt MX$_2$ or MY;

and, next, (ii) heating the reaction mixture to give the MOF solid, wherein Ti$^{IV}$ and the at least one divalent metal M$^{II}$$_{(1-5)}$ jointly form an interconnected metal cluster with the ligand L, wherein Ti$^{IV}$ and the at least one divalent metal M$^{II}$$_{(1-5)}$ homogeneously distributed at atomic level in the MOF.

15. The synthesis method, according to claim 14, wherein the stoichiometric relationship between the at least one divalent metal salt and the ligand is comprised between 1:1.1 and 1:6, such that the ligand is in stoichiometric excess.

16. The synthesis method, according to claim 14, wherein the inorganic acid is hydrochloric acid.

17. The Ti(IV) heterometallic MOF solid, according to claim 6, wherein the ligand L is trimesic acid; the divalent metal is Fe$_{II}$; and the polar solvent S is N,N'-dimethylformamide.

18. The synthesis method, according to claim 14, wherein the Ti(IV) precursor and the at least one salt of a divalent metal of formula MX$_2$ or MY are added to the mixture in a ratio comprised between 99:1 and 50:50.

19. The synthesis method, according to claim 14, wherein the Ti(IV) precursor is selected from a Ti(IV) organometallic precursor, a Ti(IV) alkoxide, Ti(IV) isopropoxide, Ti(IV) methoxide, Ti(IV) ethoxide, Ti(IV) n-propoxide, Ti(IV) n-butoxide, Ti(IV) (triethanolanninato)isopropoxide, Ti(IV) tert-butoxide, Ti(IV) oxyacetylacetonate, Ti(IV) tetrachloride, bis-(cyclopentadienyl)-Ti(IV) dichloride, cyclopentadienyl-Ti(IV) trichloride, Ti(IV) oxosulphate, a Ti(IV) polynuclear compound stable in the air, a Ti(IV) hexanuclear complex, a Ti(IV) heterometallic MOF solid, or a Ti(IV) heterometallic MOF solid of the formula [Ti$^{IV}$$_3$M$^{II}$$_3$(O)$_3$L$_4$]S wherein:

each of M$^{II}$ is independently a Mg$^{2+}$, Ca 2+, Sr$^{2+}$, Ba 2+, Ti$^{2+}$, V$^{2+}$, Cr$^{2+}$, Mn$^{2+}$, Fe$^{2+}$, Co$^{2+}$, Ni$^{2+}$, Cu$^{2+}$, Zn$^{2+}$, or Cd$^{2+}$, cation;

S is at least one molecule of N, N'-dimethylformamide, N, N'-diethylformamide, N, N'-dimethylacetamide, N-methyl-2-pyrrolidone, methanol, ethanol, isopropanol, n-propanol, water, and mixtures thereof.

20. The synthesis method, according to claim 14, wherein the ligand L is 1,3,5-benzenetricarboxylic acid.

* * * * *